(12) United States Patent
Reuter et al.

(10) Patent No.: US 12,275,864 B2
(45) Date of Patent: Apr. 15, 2025

(54) SELF-RELEASING, PIGMENTED IN-MOLD-COATING (IMC) FOR COATING SUBSTRATES

(71) Applicant: BASF Coatings GmbH, Münster (DE)

(72) Inventors: Karin Reuter, Muenster (DE); Lea Fedeler, Muenster (DE); Simon Winzen, Muenster (DE); Aileen Kock, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 932 days.

(21) Appl. No.: 17/296,006

(22) PCT Filed: Nov. 8, 2019

(86) PCT No.: PCT/EP2019/080638
§ 371 (c)(1),
(2) Date: May 21, 2021

(87) PCT Pub. No.: WO2020/104214
PCT Pub. Date: May 28, 2020

(65) Prior Publication Data
US 2022/0017758 A1    Jan. 20, 2022

(30) Foreign Application Priority Data
Nov. 23, 2018  (EP) .................................. 18208063

(51) Int. Cl.
| | | |
|---|---|---|
| *C09D 7/41* | (2018.01) |
| *B29C 45/16* | (2006.01) |
| *C09D 7/20* | (2018.01) |
| *C09D 7/65* | (2018.01) |
| *C09D 133/10* | (2006.01) |
| *C09D 167/00* | (2006.01) |
| *C09D 171/00* | (2006.01) |
| *C09D 175/04* | (2006.01) |
| *C09D 183/06* | (2006.01) |
| *B29K 105/00* | (2006.01) |

(52) U.S. Cl.
CPC ........... *C09D 7/41* (2018.01); *B29C 45/1679* (2013.01); *C09D 7/20* (2018.01); *C09D 7/65* (2018.01); *C09D 133/10* (2013.01); *C09D 167/00* (2013.01); *C09D 171/00* (2013.01); *C09D 175/04* (2013.01); *C09D 183/06* (2013.01); *B29K 2105/0032* (2013.01)

(58) Field of Classification Search
CPC ... C09D 7/41; C09D 7/20; C09D 7/65; C09D 133/10; C09D 167/00; C09D 171/00; C09D 175/04; C09D 183/06; C09D 175/06; B29K 2105/0032; C08G 77/16; C08G 77/46; C08G 2110/0066; C08G 18/792; C08G 18/4063; C08G 18/227; C08G 18/61; C08G 18/6225; C08G 18/7664; C08G 18/4202
USPC ........................................................ 524/588
See application file for complete search history.

(56) References Cited

U.S. PATENT DOCUMENTS

| | | | |
|---|---|---|---|
| 6,093,222 A | 7/2000 | Grabowski et al. | |
| 6,579,593 B1 | 6/2003 | Mori et al. | |
| 10,907,069 B2* | 2/2021 | Corten | C08K 5/05 |
| 2005/0214559 A1 | 9/2005 | Minoda et al. | |
| 2009/0244479 A1* | 10/2009 | Zanini | G02B 1/043 |
| | | | 523/108 |
| 2010/0160562 A1 | 6/2010 | Beppu et al. | |
| 2010/0317787 A1* | 12/2010 | Baghdachi | C08G 77/458 |
| | | | 524/441 |
| 2015/0132243 A1* | 5/2015 | Teboul | A61K 8/8152 |
| | | | 424/70.6 |

FOREIGN PATENT DOCUMENTS

| | | |
|---|---|---|
| JP | H03159709 A | 7/1991 |
| JP | H07329099 A | 12/1995 |
| JP | H08217979 A | 8/1996 |
| JP | 2000103015 A | 4/2000 |
| JP | 2000178571 A | 6/2000 |
| JP | 2000265068 A | 9/2000 |
| JP | 2001018808 A | 1/2001 |
| JP | 2009154457 A | 7/2009 |
| JP | 2009155272 A | 7/2009 |
| JP | 2010144046 A | 7/2010 |
| JP | 2011099097 A | 5/2011 |
| JP | 2013144287 A | 7/2013 |
| JP | 201616368 A | 2/2016 |
| JP | 2017186704 A | 10/2017 |
| JP | 201828049 A | 2/2018 |

OTHER PUBLICATIONS

"TSF 451 Series", Momentive Performance Materials, pp. 1-20 (1985).
International Search Report for corresponding PCT/EP2019/080638 mailed Jan. 10, 2020, 2 Pages.

* cited by examiner

*Primary Examiner* — Hannah J Pak
(74) *Attorney, Agent, or Firm* — Armstrong Teasdale LLP

(57) ABSTRACT

Described herein is a pigmented composition which is suitable for coating components in an in-mold coating process, a process for coating components, and a method of using the composition for improving the flow behavior of compositions used for producing components. The composition includes at least one solvent L, at least one alkoxylated fatty acid and/or fatty alcohol, at least one alkoxylated polysiloxane, and at least one color base BF.

19 Claims, No Drawings

SELF-RELEASING, PIGMENTED IN-MOLD-COATING (IMC) FOR COATING SUBSTRATES

CROSS-REFERENCE TO RELATED APPLICATIONS

This application is a U.S. National Phase Application of International Patent Application No. PCT/EP2019/080638, filed Nov. 8, 2019, which claims priority to European Patent Application No. 18208063.0, filed Nov. 23, 2018, the entire contents of which are hereby incorporated by reference herein.

FIELD OF INVENTION

The present invention relates to a pigmented composition which is suitable for coating components in the in-mold coating process, to a process for coating components, and to improving the flow behavior of compositions used for producing components.

PRIOR ART

A wide variety of different components with variable layer thicknesses are nowadays mostly produced by means of the injection molding method. Certain materials, especially foams of low density, are unsuited to producing components, however, since they may exhibit problems of propensity to soiling, of UV stability, and of defect-free processing. However, particularly in the area of production of footwear soles or in the area of the furniture industry, there is an ongoing demand for such components for the production of footwear or upholstered furniture. One way of endowing such components with enhanced protection is by coating. The coating must on the one hand have effective adhesion on the component, but on the other hand must be sufficiently flexible and elastic to allow the coated components to be employed even in areas involving high mechanical stressing.

The components are usually coated at present after they have been produced, in an overmolding process, for example, or by subsequent lacquering processes. Such processes, however, are inefficient, since they necessitate a further process step after production. Moreover, prior to further coating with a basecoat and/or clearcoat, for example, or to adhesive bonding to other components, it is necessary to remove the external release agent which is used when producing the components and which permits demolding of the components from the molding tool without damage; such removal entails costly and inconvenient cleaning processes. Furthermore, the tools used must also be subjected to ongoing cleaning. Further disadvantages associated with the use of external mold release agents include a frequent lack of compatibility between release agent and the composition used for producing the component, and/or between release agent and molding tool, leading to adhesion problems. When external release agents are used, moreover, there is an increase in the cost and complexity of the process and hence in the operating times. Furthermore, the use of external release agents leads frequently to shiny surfaces on the components produced, this being unwanted especially in the footwear industry. Especially when using foams in order to produce components, furthermore, irregular surface structures, especially rough surface structures and also those in some cases having exposed fibers or pores, are obtained and cannot be entirely eliminated either by using an external release agent or by means of subsequent coating with coating films—in general, surfacer coats, basecoats, and clearcoats.

It is therefore desirable to coat the material directly during production and thereby to do without a separate coating step. One possible process enabling the components to be coated during their production is the in-mold process. With this process, molding is carried out onto substrates which have already been inserted into the molding tool, such as fabric, paper, wood veneer, or foils with any desired printing or structuring. Here as well it is necessary to apply an external release agent in order to ensure damage-free demolding of the components produced.

It is desirable, moreover, for the material to be colored in a specific hue directly during production, and to thereby do without separate lacquering steps. It is known practice in the prior art to color foams in a masterbatch process and/or to cover them with colored foils using a vacuum process. These methods, however, do not result in high accuracy of hue. In the case of vacuum foil coating, moreover, there are also instances of stress whitening, creasing, and problems with edge masking. Where foams are colored, only a limited color selection is available. Furthermore, the addition of high pigment fractions to the foam, to achieve especially strong hues, may result in losses in foam performance.

An advantage, accordingly, would be a composition not only allowing pigmented, stable and flexible coating of the component but also leading at the same time to damage-free demolding of the component produced, thereby obviating the use of external release agents. The composition ought to lead to a coating of high accuracy of hue, hue stability, hue intensity, and hue homogeneity, and ought, moreover, to enable a high diversity of hues. Moreover, the coating resulting from the composition should not exhibit an irregular and/or shiny surface. Furthermore, the coating should result in a better flow behavior of the material used for producing the components, in order thereby to allow a defect-free production even of complex geometries, such as footwear soles or components having struts a few millimeters wide. Additionally, without costly and inconvenient cleaning and/or grinding steps, it ought to be possible to recoat the coated components produced, using commercial basecoat and/or clearcoat materials, and/or to bond them using adhesives.

Problem and Solution

A problem for the present invention to address, accordingly, was that of providing a pigmented coating material which, without use of an external release agent, permits damage-free demolding from the usually metallic tool surface, while at the same time exhibiting high accuracy of hue, hue stability, hue intensity, and hue homogeneity, ensuring high diversity of hues, and guaranteeing outstanding adhesion on the substrate. Furthermore, the coatings ought to be able to be recoated with another coating film, as for example a basecoat and clearcoat, without costly and inconvenient steps of cleaning and/or grinding subsequently. In particular, even foams or other materials with a porous surface are to be able to be provided seamlessly with highly elastic, flexible, pigmented coverings which, moreover, are UV-resistant. To allow short operating times, moreover, the pigmented coating material ought to exhibit short flashing times. Furthermore, the pigmented coating material ought also to improve the flow properties of compositions used in the production of coated moldings, in order thus to allow the production of defect-free components even of complex geometry.

Solution to the Problem

It has been found that the stated problems could be solved by a pigmented composition, more particularly pigmented coating material composition comprising
(a) at least one solvent L,
(b) at least one compound of the general formula (I)

  (I)

in which $R^1$ is a saturated or unsaturated, aliphatic hydrocarbon radical having 6 to 30 carbon atoms,
$R^2$ is H, a $PO(OH)_2$ radical, or the optionally partially phosphated radical of a monosaccharide or disaccharide, or the optionally partially phosphated radical of an alditol,
AO stands for one or more alkylene oxide radicals selected from the group consisting of ethylene oxide, propylene oxide and butylene oxide,
r is 0 or 1, and s is 0 to 30;
(c) optionally at least one polyether-modified alkylpolysiloxane,
(d) at least one polysiloxane of the general formula (II)

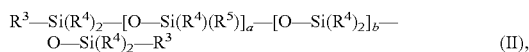  (II), in which
$R^3$ and $R^4$, in each case independently of one another, are a methyl group or a $(HO-CH_2)_2-C(CH_2-CH_3)-CH_2-O-(CH_2)_3-*$ radical,
$R^5$ is a methyl group,
a is 0 or 1 to 10, and
b is 3 to 30;
(e) at least one color base BF, and
(f) optionally at least one binder B.

Additionally, the problems have been solved by a process for producing a coated molding, by
(A) applying a pigmented composition of the invention to a surface of a molding tool to form a coating material film,
(B) flashing the coating material film,
(C) applying a composition forming the component to the flashed coating material film,
(D) crosslinking the composition and the coating material film, and
(E) subsequently removing the coated component.

Lastly, the problems have been solved through the use of a pigmented composition of the invention for improving the flow behavior of compositions used for producing components.

The above-stated pigmented composition is also referred to below as the composition of the invention and, accordingly, is a subject of the present invention. Preferred embodiments of the composition of the invention are evident from the description hereinafter and also from the dependent claims.

Because of the short flashing and crosslinking times, the pigmented composition of the invention not only allows short operating times but also leads to damage-free demolding of the coated components produced. Moreover, the pigmented composition of the invention results in high accuracy of hue, hue stability, hue intensity and hue homogeneity and also ensures high diversity of hues. Moreover, with the pigmented composition of the invention, it is also possible to generate effects, such as metallic, pearl, and flip-flop, for example, or to obtain fading effects by applying compositions having different hues. This composition, moreover, exhibits high adhesion to the component produced and permits aftercoating with commercial basecoat and/or clearcoat materials, and/or adhesive bonding, without costly and inconvenient cleaning and/or grinding steps. Even without aftercoating, the coating obtained on the component by the composition is highly elastic or flexible and also UV-stable and exhibits a consistent degree of gloss or mattness, thus resulting not only in damage-free demolding of the coated component but also in effective protection of the coated component produced with respect to environmental influences, such as UV radiation, dirt or the like, as early as immediately after production, in other words without further treatment of the component. Moreover, the coated components produced have a regular surface even when produced using foams which, in combination with conventional release agent compositions, lead to components having a highly irregular surface. Furthermore, it has also been possible to produce components having complex geometries, examples being footwear soles and also components with struts a few millimeters wide, without defects, since the composition of the invention leads to an improvement in the flow behavior. In this way, even complex geometries are fully filled with the composition. Since only small residues of the composition remain in the molding tool, the molding tools used do not have to be cleaned before every further application of the composition.

DETAILED DESCRIPTION

Definitions

First of all a number of terms used in the context of the present invention will be elucidated.

The term "polyether-modified alkylpolysiloxane" in accordance with the invention represents an alkylpolysiloxane which is modified with polyether groups at the terminal ends and/or in the main chain. These polyether groups may be bonded directly and/or via an alkyl group to the silicon atom of the alkylpolysiloxane. The polyether groups are preferably bonded directly to the silicon atom of the alkylpolysiloxane. Preferred polyether groups present are ethylene oxide, propylene oxide and butylene oxide groups.

The term "binder" in the sense of the present invention and in agreement with DIN EN ISO 4618 (German version, date: March 2007) refers preferably to those nonvolatile fractions of the composition of the invention that are responsible for film formation, with the exception of any pigments and fillers included therein; more particularly, to the polymeric resins which are responsible for film formation. The nonvolatile fraction may be determined by the method described in the Examples section.

The term "poly(meth)acrylate" refers both to polyacrylates and to polymethacrylates. Poly(meth)acrylates may therefore be composed of acrylates and/or methacrylates and may comprise further ethylenically unsaturated monomers, such as styrene or acrylic acid, for example.

The term "aliphatic radical" refers herein to a radical of an acyclic or cyclic, saturated or unsaturated carbon compound, this radical containing no aromatic structures. Aliphatic radicals may accordingly, however, contain heteroatoms, such as oxygen or nitrogen, for example.

A component in accordance with the invention means an individual part which, joined with other components, forms an assembly. If, therefore, the component is part of a bodywork, of a motor vehicle, for example, it can be assembled with other bodywork components to form a bodywork. Where, for example, the component is a footwear sole, it can be assembled with other components of a footwear item to form such an item. In general, however, independently of the purpose of the material as being able to serve as a component, the invention relates generally to the production of coated components and is therefore not limited to components in the above sense. Consequently, where reference is made below to the coating of components, this also generally embraces the coating of materials without a "component" function; in other words, such materials need not necessarily be used as a component for producing assemblies.

A coated component in accordance with the invention means a component which has a coating on the surface. The coating is applied to the surface of the component by crosslinking of the composition of the invention during the production of said component. The coating of the component, accordingly, concerns the crosslinked composition of the invention.

Flashing of the composition of the invention means the active or passive evaporation of solvents L in the composition, usually at a temperature which is higher than the ambient temperature and which is 40 to 90° C. for example. During flashing, therefore, solvents L present in the applied composition undergo evaporation. The composition is able to run during flashing, because it is still fluid at any rate directly after application and at the start of flashing. This is because at least a composition applied by spraying is generally applied in droplet form and not in uniform thickness. As a result of the solvents L present, however, the composition is fluid and is therefore able to run to form a uniform, smooth coating film. At the same time, solvents L undergo successive evaporation, and so the composition layer on the surface resulting from the flashing phase is comparatively smooth and comprises less solvent L than the applied composition. This layer after flashing, however, is not yet in the ready-to-use state. While it is indeed, for example, no longer fluid, it is still soft or tacky, and may have undergone only partial drying. In particular, this layer is not yet crosslinked.

Crosslinking refers to the curing of the composition of the invention and of the composition forming the component, in other words the conversion of these compositions into the ready-to-use state, meaning a state in which the component furnished with the composition can be transported, stored, and used as intended. A crosslinked composition and also a crosslinked component, therefore, in particular are no longer soft or tacky, having instead been conditioned as a solid coating film or solid component, respectively. Even on further exposure to crosslinking conditions as described later on below, the film or component no longer exhibits any substantial change in its properties such as hardness or adhesion to the substrate.

Compositions of the invention, and also the compositions used in producing the component, may in principle be cured physically and/or chemically, depending on the components included, such as binders and crosslinking agents. The compositions are in particular cured chemically. Chemical curing comprehends thermochemical curing and actinic-chemical curing. The composition of the invention and also the compositions used in producing components, insofar as they are thermochemically curable, may be self-crosslinking and/or externally crosslinking. The term "self-crosslinking and/or externally crosslinking" in the context of the present invention means that polymers are included as binders and possibly crosslinking agents and are able to crosslink with one another accordingly. The mechanisms involved and also the binders and crosslinking agents (film-forming components) that can be used are described later on below.

In the context of the present invention, "thermochemically curable" and, respectively, the term "thermochemical curing" refer to the crosslinking of the composition (formation of a cured composition) that is initiated by chemical reaction of reactive functional groups, with the possibility of energetic activation of this chemical reaction by means of thermal energy. Here, different functional groups, which are complementary to one another, may react with one another (complementary functional groups), and/or the formation of the cured composition is based on the reaction of autoreactive groups, these being functional groups which react with groups of their own kind. Examples of suitable complementary reactive functional groups and autoreactive functional groups are known from German patent application DE 199 30 665 A1, page 7, line 28 to page 9, line 24, for example.

This crosslinking may be self-crosslinking and/or external crosslinking. Where, for example, the complementary reactive functional groups are already present in an organic polymer used as binder, as for example in a polyester, a polyurethane or a poly(meth)acrylate, the crosslinking involved is self-crosslinking. External crosslinking is involved, for example, if a (first) organic polymer or a first compound containing particular functional groups, hydroxyl groups for example, reacts with a conventional crosslinking agent, as for example with a polyisocyanate and/or with a melamine resin. The crosslinking agent therefore contains reactive functional groups which are complementary to the reactive functional groups present in the (first) organic polymer used as binder.

In the case of external crosslinking in particular, the systems contemplated are the conventional multicomponent systems, especially two-component systems. In these systems, the components to be crosslinked, as for example the organic polymers as binders and the crosslinking agents, are present separately from one another in at least two components, which are not combined until shortly before the application. This form is selected when the components to be crosslinked react with one another effectively even at ambient temperatures or slightly elevated temperatures of 40 to 90° C., for example. A combination which may be stated by way of example is that of hydroxy-functional polyesters and/or polyurethanes and/or poly(meth)acrylates with free polyisocyanates as crosslinking agents.

It is also possible for an organic polymer as binder to have not only self-crosslinking but also externally crosslinking functional groups and to then be combined with crosslinking agents.

In the context of the present invention, "actinic-chemically curable" or the term "actinic-chemical curing" refers to the fact that curing is possible with application of actinic radiation, this being electromagnetic radiation such as near infrared (NIR) and UV radiation, especially UV radiation, and also particulate radiation such as electron beams. Curing by UV radiation is customarily initiated by radical or cationic photoinitiators. Typical actinically curable functional groups are carbon-carbon double bonds, in which case radical photoinitiators are generally employed. Actinic curing, then, is likewise based on chemical crosslinking.

In the curing of a composition labeled as being chemically curable, there will of course always be some physical curing, referring to the interlooping of polymer chains. The physical curing may even account for the major proportion. Nevertheless, a composition of this kind, if it comprises at least proportionally film-forming components that are chemically curable, is referred to as being chemically curable.

It follows from the above that, according to the nature of the coating composition and the components it comprises, curing is brought about by different mechanisms, which of course also necessitate different curing conditions—in particular, different curing temperatures and curing times.

All of the temperatures elucidated in the context of the present invention should be understood as the temperature of the molding tool in which the compositions are situated. It does not mean, therefore, that the compositions must themselves have the corresponding temperature.

The measurement methods to be employed in the context of the present invention for determining certain characteristic variables can be found in the Examples section. Unless explicitly indicated otherwise, these measurement methods are to be employed for determining the respective characteristic variable. Where reference is made in the context of the present invention to an official standard without any indication of the official period of validity, the reference is implicitly to that version of the standard that is valid on the filing date, or, in the absence of any valid version at that point in time, to the last valid version.

Composition of the Invention:

The composition of the invention is preferably a self-releasing coating material composition.

The composition of the invention preferably possesses a solids content of 30 to 60 wt %, more preferably of 35 to 55 wt %, very preferably of 40 to 50 wt %, more particularly of 42 to 48 wt %, based on the total weight of the composition. The solids content was determined according to ASTM D2369 (2015) at 110° C. for 60 min on a 2 gram sample of the composition.

It is preferred in accordance with the invention, furthermore, if the composition has a viscosity of 10 to 60 s, more particularly of 20 to 30 s (DIN4 flow cup), measured according to DIN EN ISO 2431 (March 2012). Establishing a low viscosity facilitates the application of the composition and therefore ensures sufficient wetting of the molding tool and also uniform coating of the component.

Solvent L:

As a first essential constituent, the composition of the invention comprises at least one solvent L.

The composition of the invention may be a solvent-based composition or an aqueous composition. In the case of a solvent-based composition, organic solvents are included as a principal constituent. Organic solvents constitute volatile constituents of the composition of the invention, and undergo complete or partial vaporization on drying or flashing, respectively. The principal constituent of aqueous compositions is water.

Preferably in accordance with the invention the at least one solvent L is selected from organic solvents, water, and mixtures thereof, and is present in a total amount of 40 to 70 wt %, more preferably 45 to 65 wt %, and very preferably 50 to 60 wt %, especially 52 to 58 wt %, based in each case on the total weight of the composition.

Organic solvents preferred in the context of the present invention are aprotic. With particular preference they are polar aprotic organic solvents. With very particular preference the organic solvents are chemically inert toward the remaining constituents of the composition.

Preferred organic solvents in the context of the present invention are, for example, ketones such as acetone, methyl ethyl ketone, cyclohexanone, methyl isobutyl ketone, methyl isoamyl ketone or diisobutyl ketone; esters such as ethyl acetate, n-butyl acetate, ethylene glycol diacetate, butyrolactone, diethyl carbonate, propylene carbonate, ethylene carbonate, 2-methoxypropyl acetate (MPA), and ethyl ethoxypropionate; amides such as N,N-dimethylformamide, N,N-dimethylacetamide, N-methylpyrrolidone, and N-ethylpyrrolidone; methylal, butylal, 1,3-dioxolane, glycerol formal; and, somewhat less preferably because they are nonpolar, hydrocarbons such as benzene, toluene, n-hexane, cyclohexane, and solvent naphtha. Especially preferred solvents belong to the class of the esters, among which n-butyl acetate and 1-methoxypropyl acetate are very especially preferred.

Compound of the General Formula (I) (b):

The composition of the invention comprises, as a second essential constituent, at least one compound of the formula (I):

$$R^1(C=O)_r-O-(AO)_s-R^2 \quad (I)$$

in which $R^1$ is a saturated or unsaturated, aliphatic hydrocarbon radical having 6 to 30 carbon atoms, preferably 8 to 26, more preferably 10 to 24, and very preferably 12 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide, propylene oxide and butylene oxide, r is 0 or 1, and s is 0 to 30, preferably 1 to 25 or 2 to 25, more preferably 4 to 22 or 6 to 20, and very preferably 8 to 18.

The radical $R^1$ is preferably an acyclic radical.

The radicals AO may be identical or different and within the s radicals may have a random, blockwise or gradientlike arrangement. Where two or more different kinds of AO are included, it is preferred if the fraction of ethylene oxide is more than 50 mol %, more preferably at least 70 mol %, and very preferably at least 90 mol %, based on the total molar amount of the radicals AO. In the aforementioned cases the radicals different from ethylene oxide are preferably propylene oxide radicals.

Where r=0 and s>0, the species of the formula (I) are alkoxylated fatty alcohols, preferably ethoxylated fatty alcohols, which optionally are phosphated ($R^2=PO(OH)_2$) or etherified with a monosaccharide or disaccharide or with the radical of an alditol. Where r=1 and s>0, the species of the formula (I) are alkoxylated fatty acids, preferably ethoxylated fatty acids, which optionally are phosphated ($R^2=PO(OH)_2$) or etherified with a monosaccharide or disaccharide or with the radical of an alditol.

Where s=0 and $R^2$ is the radical of a monosaccharide or disaccharide or the radical of an alditol, then the species of formula (I) are fatty alcohol ethers of a monosaccharide or disaccharide or of an alditol (r=0) or are fatty acid esters of a monosaccharide or disaccharide or of an alditol (r=1).

With particular preference, for some or all the species of the formula (I), s is 2 to 25, better still 6 to 20, and ideally 8 to 18, and/or, for some or all the species of the formula (I), s is 0 and $R^2$ is an optionally partially phosphated radical of a monosaccharide or disaccharide or is an optionally partially phosphated radical of an alditol. With particular preference $R^1$ in this case is a saturated or unsaturated, aliphatic hydrocarbon radical having 10 to 24 carbon atoms.

In particular it is also possible to use mixtures of the species of the formula (I) in which s is 0 for at least one species while for at least one further species s is >0, preferably 1 to 25 or 2 to 25, more preferably 4 to 22 or 6 to 20, and very preferably 8 to 18.

With particular preference, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide and propylene oxide, r is 0 or 1, and s is 0 or 1 to 25.

With further particular preference, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or the optionally partially phosphated radical of an alditol, more particularly of sorbitol, AO stands for one or more alkylene oxide radicals selected from the group consisting of ethylene oxide and propylene oxide and the ethylene oxide fraction in the total molar amount of the radicals AO is at least 70 mol %, r=0 or 1, and s=0 or s=6 to 20.

Especially preferred are mixtures which comprise the aforesaid alkoxylated fatty alcohols with s>0 and/or the aforesaid alkoxylated fatty acids with s>0 and at least one further species selected from the group encompassing optionally phosphated or etherified fatty alcohols where r=s=0 and $R^2$=H, $PO(OH)_2$, a monosaccharide radical, disaccharide radical or alditol radical, and optionally phosphated or esterified fatty acids where r=1, s=0, and $R^2$=H, $PO(OH)_2$, monosaccharide radical, disaccharide radical or alditol radical.

The total weight of the compound of the general formula (I) is preferably 0.1 to 10 wt %, more preferably 0.5 to 5 wt %, more particularly 1.5 to 4 wt % based in each case on the total weight of the composition. Where more than one compound of the formula (I) is used, the quantity figures indicated above are based on the total amount of all compounds which fall within the formula (I). If the compound of the formula (I) is limited to a particular compound (I-1), then the quantities indicated above are based not merely on the particular compound (I-1) but instead on the total amount of compounds which fall within the formula (I). If, for example, the particular compound (I-1) is used in an amount of 5 wt %, then there may be at most 5 wt % of further compounds falling within the formula (I) present in the composition of the invention.

Polyether-Modified Alkylpolysiloxane (c):

The composition of the invention may further comprise at least one polyether-modified alkylpolysiloxane. The use of such siloxanes leads to reduced dirt pickup of the coated components.

Preferably the polyether-modified alkylpolysiloxane comprises at least one structural unit $(R^7)_2(OR^6)SiO_{1/2}$ and at least one structural unit $(R^7)_2SiO_{2/2}$, where $R^6$ is an ethylene oxide, propylene oxide, and butylene oxide group, more particularly a mixture of ethylene oxide and propylene oxide and butylene oxide groups, and $R^7$ is a $C_1$-$C_{10}$ alkyl group, more particularly a methyl group.

It is preferred in this context if the polyether-modified alkylpolysiloxane has a molar ratio of siloxane to ethylene oxide to propylene oxide to butylene oxide groups of 6:21:15:1 to 67:22:16:1.

It is preferred in this context, furthermore, if the polyether-modified alkylpolysiloxane has a molar ratio of the structural unit $(R^7)_2(OR^6)SiO_{1/2}$ to the structural unit $(R^7)_2SiO_{2/2}$ of 1:10 to 1:15, more particularly of 1:10 to 1:13. $R^6$ and $R^7$ here have the definitions recited above.

The composition may comprise 0 wt % or 0.1 to 6 wt %, preferably 0.5 to 4 wt %, more particularly 0.8 to 3 wt %, based in each case on the total weight of the composition, of polyether-modified alkylpolysiloxanes, more particularly of the specific polyether-modified alkylpolysiloxanes recited above. The absence of such compounds makes the composition less tacky. As a result, the effect of demolding of the coated component produced from the molding tool is improved.

Polysiloxane of the Formula (II) (d):

The composition of the invention further comprises at least one polysiloxane of the general formula (II)

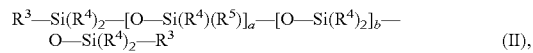

$$R^3—Si(R^4)_2—[O—Si(R^4)(R^5)]_a—[O—Si(R^4)_2]_b—O—Si(R^4)_2—R^3 \quad (II),$$

in which $R^3$ and $R^4$, in each case independently of one another, are a methyl group or a $(HO—CH_2)_2—C(CH_2—CH_3)—CH_2—O—(CH_2)_3—*$ radical, $R^5$ is a methyl group, a is 0 or 1 to 10, and b is 3 to 30.

The $(HO—CH_2)_2—C(CH_2—CH_3)—CH_2—O—(CH_2)_3—*$ radical here is bonded via the * symbol to the silicon atom.

Used with preference in accordance with the invention are polysiloxanes which have particular radicals $R^3$ and $R^4$. The use of such polysiloxanes has proven advantageous in relation to the improved demoldability, but without adversely affecting the adhesion of the crosslinked composition of the invention to the component. In one preferred embodiment of the present invention, therefore, in the general formula (II), the radical $R^3$ is a $(HO—CH_2)_2—C(CH_2—CH_3)—CH_2—O—(CH_2)_3—*$ radical, the radical $R^4$ is a methyl group, the radical $R^5$ is a methyl group, a is 0, and b is 7 to 14.

Advantageously in accordance with the invention, the composition comprises the at least one polysiloxane of the formula (II), more particularly the specific polysiloxanes recited above, in a particular total amount. It is therefore preferred in accordance with the invention if the composition comprises the at least one polysiloxane of the general formula (II) in a total amount of 0.1 to 5 wt %, preferably 0.5 to 4 wt %, more particularly 0.8 to 2.5 wt %, based in each case on the total weight of the composition. If more than one polysiloxane of the formula (II) is used, then the quantity figures indicated above are based on the total amount of all the polysiloxanes which fall within the formula (II). If the polysiloxane of the formula (II) is limited to particular polysiloxanes (II-1), then the quantities indicated above are based not only on the particular polysiloxanes (II-1), but instead on the total amount of polysiloxanes which fall within the formula (II). Where, for example, the particular polysiloxanes (II-1) are used in an amount of 2 wt %, there may be at most 3 wt % of further polysiloxanes which fall within the formula (II) present in the composition of the invention.

Color Base BF (e):

The composition of the invention further comprises at least one color base BF. A color base BF here means a colorant with a precisely defined hue. By using the at least one color base BF high accuracy of hue is achieved. Moreover, a high diversity of hue is possible, since different color bases BF having different hues can be mixed with one another in order to achieve the desired hue.

The at least one color base BF is present preferably in a particular total amount in the composition of the invention. It is therefore advantageous in accordance with the invention if the pigmented composition comprises the at least one color base BF in a total amount of 5 to 40 wt %, more particularly of 10 to 20 wt %, based on the total weight of the composition. The use of the at least one color base BF in the total amounts recited above ensures a high intensity of hue.

With particular preference the at least one color base BF comprises at least one effect pigment and/or at least one coloring pigment.

Effect pigments are pigments which are able to produce a decorative effect in coatings and additionally, but not exclusively, to produce a coloring effect. The effect pigments are notable in particular for a plateletlike construction. Preferred effect pigments are, for example, platelet-shaped metallic effect pigments such as platelet-shaped aluminum pigments, gold bronzes, oxidized bronzes and/or iron oxide-aluminum pigments, pearlescent pigments and/or metal oxide-mica pigments, and/or other effect pigments such as platelet-shaped graphite, platelet-shaped iron oxide, multilayer effect pigments composed of PVD films, and/or liquid crystal polymer pigments. Particularly preferred are platelet-shaped metallic effect pigments, more particularly platelet-shaped aluminum pigments and/or coated metal oxide-mica pigments and/or borosilicates coated with metal oxides.

Examples of inorganic coloring pigments are white pigments such as titanium dioxide; black pigments such as carbon black, iron manganese black or spinel black; chromatic pigments such as ultramarine green, ultramarine blue or manganese blue, ultramarine violet or manganese violet, red iron oxide, molybdate red or ultramarine red; brown iron oxide, mixed brown, phases of spinel and corundum; or yellow iron oxide or bismuth vanadate. Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

The at least one effect pigment and/or the at least one coloring pigment are present preferably in a total amount of 0.5 to 70 wt %, based on the total weight of the color base BF.

Provision may also be made for the color base to comprise at least one binder. This binder serves for stable dispersing of the pigment and in that way ensures high intensity of hue and high homogeneity of hue on the part of the color base BF.

Binders used in the color base BF are preferably polyurethane polymers, more particularly anionically stabilized polyurethane polymers. By anionically stabilized polyurethane polymers are meant polyurethane polymers which comprise at least one group that can be converted by neutralizing agents into an anionic group (i.e., a potentially anionic group). Examples of the potentially anionic groups which can be converted into anionic groups by neutralizing agents include carboxylic, sulfonic and/or phosphonic acid groups, more particularly carboxylic acid groups.

The polyurethane polymers are obtainable by reaction of a prepolymer containing isocyanate groups with compounds that are reactive toward isocyanate groups. The components are reacted preferably in the customary and known organic solvents. The amount of organic solvents may vary within wide limits here, and ought to be sufficient for the formation of a prepolymer solution of suitable viscosity. In general up to 70 wt %, preferably 5 to 50 wt %, and more preferably less than 20 wt % of solvents are used, based on the solids content. Hence the reaction may for example be carried out, especially preferably, at a solvent content of 10 to 15 wt %, based on the solids content.

Polyurethane polymers of this kind preferably have a number-average molecular weight (determination: gel permeation chromatography with polystyrene as standard) of 1000 to 30 000 g/mol, more preferably of 1500 to 20 000 g/mol, and also an acid number of 5 to 70 mg KOH/g, more preferably of 10 to 30 mg KOH/g (based on the solids content), and are preparable by reaction, preferably chain extension, of prepolymers containing isocyanate groups.

The prepolymer containing isocyanate groups may be prepared by reaction of polyols having a hydroxyl number of 10 to 1800, preferably 50 to 1200 mg KOH/g (based on the solids content) with excess polyisocyanates at temperatures up to 150° C., preferably 50 to 130° C., in organic solvents which are unable to react with isocyanates. The equivalent ratio of NCO groups to OH groups is between 2.0:1.0 and >1.0:1.0, preferably between 1.4:1 and 1.1:1.

The polyols used for preparing the NCO prepolymer may be of low and/or high molecular mass. For preparing anionically stabilized polyurethane polymers, the polyols contain at least one anionic group and/or group amenable to formation of anions. Also possible is the accompanying use of low molecular weight polyols having a molecular weight of 60 to 400 daltons, for preparing the prepolymers containing isocyanate groups.

In order to obtain an NCO prepolymer having high flexibility, the fraction of a predominantly linear polyol that is added, with a preferred OH number of 30 to 150 mg KOH/g (based on the solids content), ought to be high. Up to 97 wt % of the total polyol may consist of saturated and unsaturated polyesters having a number-average molecular weight $M_n$ of 400 to 5000 daltons. Polyester diols are prepared by esterification of organic dicarboxylic acids or their anhydrides with organic diols, or derive from a hydroxycarboxylic acid or a lactone. Particular preference is given to using a linear polyester which is obtainable by reaction of aliphatic and aromatic dicarboxylic acids with aliphatic diols.

Besides the polyester, the NCO prepolymer is prepared using further polyols, with at least one polyol having a carboxyl, sulfonic acid and/or phosphonic acid groups. Preferred for use are alkanoic acids having two hydroxyl groups on the carbon atom in alpha-position. These polyols have at least one, generally 1 to 3 carboxyl groups in the molecule. They have two to about 25, preferably 3 to 10, carbon atoms. The carboxyl-containing polyol may account for 3 to 100 wt %, preferably 5 to 50 wt %, of the overall polyol constituent in the NCO prepolymer.

The amount of ionizable carboxyl groups available through the carboxyl group neutralization in salt form is at least 0.4 wt %, preferably at least 0.7 wt %, based on the solids of the NCO prepolymer. The upper limit is about 12 wt %. The amount of dihydroxyalkanoic acids in the non-neutralized prepolymer gives an acid number of mg KOH/g to 40 mg KOH/g (based on the solids content).

Further polyols, having no carboxyl, sulfonic acid and/or phosphonic acid groups, are preferably selected from $C_3$-$C_8$ alkanediols, especially from 1,6-hexanediol. These diols are used customarily in an amount of 0.5 to 15 wt %, preferably 1 to 7 wt %, based in each case on the total weight of the synthesis components used in preparing the anionically stabilized polyurethane polymers.

Typical polyfunctional isocyanates used for preparing the anionic polyurethane polymers are aliphatic, cycloaliphatic and/or aromatic polyisocyanates having at least two isocyanate groups per molecule. The isomers or isomer mixtures of organic diisocyanates are preferred. On account of their high stability with respect to ultraviolet light, (cyclo)aliphatic diisocyanates result in products with a low tendency to yellow. The polyisocyanate component used to form the prepolymer may also include a fraction of higher polyisocyanates, provided this does not cause any gelling. Suitable triisocyanates are products which form by trimerization or oligomerization of diisocyanates or by reaction of diisocyanates with polyfunctional compounds containing OH or NH groups. The average functionality may optionally be lowered by addition of monoisocyanates.

Examples of polyisocyanates which can be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclo-hexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

To prepare high-solids anionic polyurethane polymer dispersions, use is made in particular of diisocyanates of the general formula (IV)

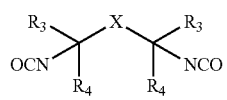

(IV)

where X is a divalent cyclic and optionally aromatic hydrocarbon radical, preferably an optionally halogen-, methyl- or methoxy-substituted dicyclohexylmethyl, naphthylene, diphenylene or 1,2-, 1,3- or 1,4-phenylene radical, more preferably a dicyclohexylmethyl radical, and $R_3$ and $R_4$ are hydrogen or an alkyl radical having 1 to 4 carbon atoms, and preferably are hydrogen. One diisocyanate of the formula (IV) which is used with particular preference in the context of the present invention is 4,4'-methylenedicyclohexyl diisocyanate (also referred to as $H_{12}MDI$).

The NCO prepolymer contains at least 0.5 wt % of isocyanate groups, preferably at least 1 wt % of NCO, based on the solids. The upper limit is 15 wt %, preferably 10 wt %, more preferably 5 wt % of NCO.

The isocyanate groups of the prepolymer containing isocyanate groups are reacted with a modifier or chain extender. The modifier is preferably added in a quantity such that there are chain extensions and hence increases in molecular weight. Modifiers used are preferably organic compounds which comprise hydroxyl groups and/or secondary and/or primary amino groups, especially polyols and/or polyamines having a functionality of two, three and/or more. Examples of polyamines which can be used are ethylenediamine, trimethylenediamine, tetramethylenediamine, pentamethylenediamine, hexamethylenediamine, or diethylenetriamine. Examples of polyols which can be used are trimethylolpropane, 1,3,4-butanetriol, glycerol, erythritol, mesoerythritol, arabitol, adonitol, etc. Preference is given to using trimethylolpropane. The equivalent ratio of NCO prepolymer to modifier is preferably between 2.0:1.0 and 1.0:2.0, more particularly between 1.1:1 and 1:1.1.

In the context of the present invention, the anionically stabilized polyurethane polymer is obtainable with particular preference by reaction of an NCO prepolymer with a modifier in the form of a polyol, more particularly trimethylolpropane, the NCO prepolymer being obtainable by reaction of (i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, the polyester polyol preferably containing no olefinic double bonds, (ii) 3 to 7 wt %, based on the total weight of the compounds (i) to (iv), of at least one alkanoic acid having 3 to 8 carbon atoms and also two hydroxyl groups on the carbon atom in alpha-position, more particularly dimethylolpropionic acid, (iii) 0.5 to 3 wt %, based on the total weight of the compounds (i) to (iv), of at least one $C_3$-$C_8$ alkanediol, more particularly 1,6-hexanediol, and (iv) 25 to 30 wt %, based on the total weight of the compounds (i) to (iv), of at least one diisocyanate of the formula (IV) where X=dicyclohexylmethyl radical and $R_3$=$R_4$ hydrogen.

The equivalent ratio of NCO prepolymer to modifier is preferably between 2.0:1.0 and 1.0:2.0, more particularly between 1.1:1 and 1:1.1.

The anionically stabilized polyurethane polymer is neutralized with a base, preferably with an organic base, more particularly with N,N'-dimethylethanolamine, the base being added in an amount such as to achieve a degree of neutralization of 50% to 100%, preferably of 60% to 80%.

The at least one binder, more particularly the aforesaid anionically stabilized polyurethane polymer, is present preferably in an amount of 10 to 80 wt %, based on the total weight of the color base BF.

The color base BF may also comprise at least one solvent. Solvents which can be used are those already stated above in connection with the solvent L (component (a) of the composition of the invention). Employed with particular preference is butyl glycol and/or methyl ethyl ketone.

In one particularly preferred embodiment of the color base BF, therefore, the color base BF, based on its total weight, comprises (a1) 0.5 to 70 wt % of at least one effect pigment and/or at least one coloring pigment, (a2) 10 to 80 wt % of at least one binder selected from the group of polyurethane polymers, amino resin polymers, polyacrylate polymers, polyester polymers, and mixtures thereof, more particularly an above-recited anionically stabilized polyurethane polymer, and (a3) at least one organic solvent.

Binder B (f):

With preference in accordance with the invention, the composition, as well as the essential constituents described above, comprises at least one binder B. This binder B is preferably different from the binder (a2) in the color base BF. The use of this binder B leads to the development of a flexible and stable coating on the component, but without adversely affecting the demoldability of the component.

Surprisingly it has emerged that the nature of the binder B is immaterial to the demoldability achieved with the composition of the invention. A further surprise was that the composition of the invention, independently of the binder B, has no adverse effect on the resulting coating, particularly on its surface quality and flexibility. The composition of the invention may therefore be combined with any desired binders B, without adversely affecting the demoldability of the component produced or the outstanding properties of the coating produced with the composition on the component. Moreover, the resulting coatings can be adhesively bonded and/or coated with basecoat and/or clearcoat materials, without costly and inconvenient aftertreatment steps.

The at least one binder B is present preferably in a total amount (solids content) of 20 to 50 wt %, more preferably of 25 to 40 wt %, more particularly 25 to 35 wt %, based in each case on the total weight of the composition. If the binder is a dispersion or solution in a solvent, the above-recited total quantities are calculated using the solids content of the binder in each case. The use of the at least one binder B in the above-recited quantity ranges ensures the development of a flexible and stable coating on the component, but without adversely affecting the demoldability of the component.

With preference in accordance with the invention the binder B is selected from the group consisting of (i) poly (meth)acrylates, more particularly hydroxy-functional and/or carboxylate-functional and/or amine-functional poly (meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers of the stated polymers, and (vi) mixtures thereof.

It is preferred in this context that the binder B is selected from hydroxy-functional poly(meth)acrylates and/or polyester polyols, more particularly from a mixture of at least one hydroxy-functional poly(meth)acrylate and at least one polyester polyol. The use of this mixture leads to coatings which have a high flexibility and also high resistance toward environmental influences. Moreover, irrespective of the surface nature of the material used for producing the component, a smooth surface is achieved. Furthermore, the coating obtained can without costly and inconvenient aftertreatment be adhesively bonded and/or coated with basecoat and/or clearcoat materials.

The hydroxy-functional poly(meth)acrylate preferably possesses a hydroxyl number of 65 to 100 mg KOH/g, more preferably of 70 to 95 mg KOH/g, more particularly of 75 to 90 mg KOH/g or of 80 to 85 mg KOH/g. The hydroxyl number in the context of the present invention may be determined according to EN ISO 4629-2:2016 and is based in each case on the solids content.

The hydroxy-functional poly(meth)acrylate preferably possesses an acid number of less than 25 mg KOH/g, more preferably an acid number of 1 to 20 mg KOH/g, very preferably an acid number of 4 to 16 mg KOH/g, more particularly of 6 to 14 mg KOH/g or of 8 to 12 mg KOH/g. The acid number for the purposes of the present invention may be determined according to DIN EN ISO 2114:2002-06 (method A) and is based in each case on the solids content.

The number-average molecular weight $M_n$ and the weight-average molecular weight $M_w$ may be determined by means of gel permeation chromatography (GPC) using a polymethyl methacrylate standard (PMMA standard) (DIN 55672-1:2016-03). The number-average molecular weight $M_n$ of the hydroxy-functional poly(meth)acrylate is preferably in a range from 4000 to 10 000 g/mol, more preferably 5000 to 9000 g/mol, very preferably 5500 to 8000 g/mol, more particularly 6000 to 7500 g/mol. The weight-average molecular weight $M_w$ of the hydroxy-functional poly(meth) acrylate is preferably in a range from 8000 to 30 000 g/mol, more preferably 10 000 to 25 000 g/mol, very preferably 12 000 to 22 000 g/mol, more particularly 14 000 to 20 000 g/mol.

The polydispersity PD ($=M_w/M_n$) of the hydroxy-functional poly(meth)acrylate is preferably in the range from 2 to 3, more particularly from 2.2 to 2.8.

The hydroxy-functional poly(meth)acrylate preferably possesses a hydroxyl functionality of 5 to 15, more preferably of 6 to 14, more particularly of 8 to 12.

The hydroxy-functional poly(meth)acrylate may be obtained by means of the polymerization reactions that are commonplace and familiar to a person of ordinary skill in the art, from ethylenically unsaturated monomers, preferably monoethylenically unsaturated monomers. Initiators which may be used include peroxides, such as di-tert-butyl peroxide, for example. It is therefore preferred for the hydroxy-functional poly(meth)acrylate to be preparable by reaction of (a1) at least one hydroxy-functional (meth)acrylic ester, more particularly (meth)acrylic ester of the formula $HC=CR^x\text{—}COO\text{—}R^y\text{—}OH$, in which $R^x$ is H or $CH_3$ and $R^y$ is an alkylene radical having 2 to 6, preferably 2 to 4, more preferably 2 or 3 carbon atoms, (a2) at least one carboxy-functional ethylenically unsaturated monomer, more particularly (meth)acrylic acid, and (a3) at least one hydroxyl-free and carboxyl-free ester of (meth)acrylic acid and/or at least one hydroxyl-free and carboxyl-free vinyl monomer, more particularly styrene.

Examples of hydroxy-functional (meth)acrylic esters (a1) are preferably hydroxyethyl methacrylate, hydroxyethyl acrylate, hydroxypropyl methacrylate, and hydroxypropyl acrylate, and with particular preference hydroxyethyl methacrylate and 2-hydroxypropyl methacrylate. The amount of hydroxy-functional (meth)acrylic esters (a1) used in preparing the hydroxy-functional poly(meth)acrylate is calculated on the basis of the target range for the hydroxyl number, of 50 to 120 mg KOH/g.

The hydroxy-functional poly(meth)acrylate preferably contains small quantities of carboxyl groups. These groups are introduced into the poly(meth)acrylate during the polymerization reaction, through the use, for example, of carboxy-functional monomers (a2), more preferably through the use of acrylic acid and/or methacrylic acid. These monomers (a2), especially (meth)acrylic acid, are present preferably in a total amount of 20 to 45 wt %, more preferably of 25 to 40 wt %, more particularly of 30 to 35 wt %, based in each case on the total weight of all the monomers used in preparing the hydroxy-functional poly(meth)acrylate.

Besides the hydroxy-functional (a1) and the carboxy-functional (a2) ethylenically unsaturated monomers, use is also made when preparing the hydroxy-functional poly (meth)acrylate of ethylenically unsaturated monomers (a3), more particularly monoethylenically unsaturated monomers (a3), these monomers being free both of hydroxyl and of carboxyl groups. Employed with particular preference as vinyl monomer (a3) is styrene. The vinyl monomer (a3), more particularly styrene, is present preferably in a total amount of 30 to 60 wt %, more preferably of 35 to 55 wt %, more particularly of 40 to 50 wt %, based in each case on the total weight of all the monomers used in preparing the hydroxy-functional poly(meth)acrylate.

The hydroxy-functional poly(meth)acrylate may be used in an organic solvent, preferably an aprotic solvent. A typical solvent for this purpose, for example, is n-butyl acetate, which may also be used when preparing the at least one hydroxy-functional poly(meth)acrylate. If the hydroxy-functional poly(meth)acrylate is used in a solvent, then the solvent is reckoned as part of the solvent L.

The hydroxy-functional poly(meth)acrylate is preferably used in a particular total amount. It is therefore advantageous in accordance with the invention if the hydroxy-functional poly(meth)acrylate is present in a total amount of 10 to 97 wt %, preferably of 40 to 70 wt %, more particularly of 40 to 50 wt %, based in each case on the total weight of the solids content of all the binders present in the composition.

The polyester polyol preferably possesses a hydroxyl number of 100 to 200 mg KOH/g, more preferably of 110 to 180 mg KOH/g, very preferably of 120 to 160 mg KOH/g, based in each case on the solids content.

The acid number of the polyester polyol is preferably 0 to 9 mg KOH/g, more particularly 0.2 to 2 mg KOH/g, based in each case on the solids content. The hydroxyl number and acid number of the polyester polyol may be determined as above in conjunction with the hydroxy-functional poly(meth)acrylate.

The number-average molecular weight of the polyester polyol is preferably in the range from 800 to 3000 g/mol, more preferably 1000 to 2000 g/mol, more particularly from 1000 to 1600 g/mol. The determination here is made as in connection with the determination of the molecular weight of the hydroxy-functional poly(meth)acrylate.

The polyester polyol is preferably branched.

The polyester polyol preferably possesses a hydroxyl functionality of 2.2 to 4, more preferably of 2.5 to 3.5, very preferably of 2.7 to 3.3.

The polyester polyol is preferably used in a particular total amount. It is therefore advantageous in accordance with the invention if the polyester polyol is present in a total amount of 40 wt % to 97 wt %, preferably of 40 to 70 wt %, more particularly of 50 to 65 wt %, based in each case on the total weight of the solids content of all the binders present in the composition.

The binder B may alternatively be selected from aqueous, anionically stabilized polyurethane dispersions, aqueous, cationically stabilized polyurethane dispersions, aqueous polyurethane-polyurea dispersions, and mixtures thereof. Suitable dispersions are described, for example, in the laid-open specifications EP 2 066 712 A1, EP 1 153 054 A1, and EP 1 153 052 A1.

The pigmented compositions of the invention preferably feature a weight ratio of pigment to binder of 0.01 to 1.2. The aforesaid weight ratio pertains to the total amount of the pigment in the composition and also binder (a2) and/or B.

Crosslinking Agent V (f):

It may be preferable in accordance with the invention if the composition comprises not only the aforesaid constituents and/or the at least one binder B but also a crosslinking agent V. With particular preference, the composition of the invention comprises a combination of the above-described binder B and the below-described crosslinking agent V.

The crosslinking agent V is preferably selected from the groups consisting of amino resins, polyisocyanates, blocked polyisocyanates, polycarbodiimides, UV light, heat, photoinitiators, and mixtures thereof.

Particular preference is given to using polyisocyanates and also polycarbodiimides as crosslinking agents V.

The use of polyisocyanates has been found appropriate especially when a mixture of the above-described at least one hydroxy-functional poly(meth)acrylate and the at least one polyester polyol is present as binder B in the composition of the invention.

In this context it is particularly preferred if the polyisocyanate possesses an NCO group functionality of greater than 2.4 to 5, preferably 2.6 to 4, more preferably 2.8 to 3.6.

Employed with particular preference in the context of the present invention are polyisocyanates which comprise at least one isocyanurate ring or at least one iminooxadiazinedione ring.

According to an alternative embodiment, two polyisocyanates different from one another may be present as crosslinking agents V, with the first polyisocyanate comprising at least one isocyanurate ring and the second polyisocyanate comprising at least one iminooxadiazinedione ring.

The polyisocyanate preferably comprises oligomers, preferably trimers or tetramers, of diisocyanates. With particular preference it comprises iminooxadiazinediones, isocyanurates, allophanates and/or biurets of diisocyanates. With particular preference the polyisocyanate comprises aliphatic and/or cycloaliphatic, very preferably aliphatic, polyisocyanates. Serving as a diisocyanate basis for the aforementioned oligomers, more particularly the aforementioned trimers or tetramers, is very preferably hexamethylene diisocyanate and/or isophorone diisocyanate, and especially preferably just hexamethylene diisocyanate.

The use of polycarbodiimides has been found appropriate especially when aqueous, anionically stabilized polyurethane dispersions, aqueous, cationically stabilized polyurethane dispersions, aqueous polyurethane-polyurea dispersions, and mixtures thereof are present as binders B in the composition of the invention.

The polycarbodiimides are preferably in the form of an aqueous dispersion. Polycarbodiimides used with particular preference are obtainable by reaction of polyisocyanates with polycarbodiimides and subsequent chain extension and/or termination by means of hydrophilic compounds containing hydroxyl groups and/or amine groups. Suitable dispersions are described in the laid-open specifications EP1644428 A2 and EP1981922 A2, for example.

Through the crosslinking agent V it is possible to influence, for example, the hardness, flexibility, and elasticity of the resulting cured coating. Use of polyisocyanates containing iminooxadiazinedione structures, in particular, leads to coatings of particular hardness, thereby preventing substrate structures propagating through to the cured coating surface and causing unwanted waviness there. Such polyisocyanates are available for example from Covestro under the name Desmodur N3900. Similar results may be achieved with polyisocyanates containing isocyanurate structures, as available for example under the name Desmodur N3800 from Covestro, in which case the coating is still hard but is more flexible.

The composition preferably comprises the at least one crosslinking agent V in a particular total amount. It is therefore preferred in accordance with the invention if the at least one crosslinking agent V is present in a total amount of 10 wt % to 40 wt %, preferably of 10 to 30 wt %, more particularly of 15 to 25 wt %, based in each case on the total weight of the composition.

It is preferred, furthermore, if the composition comprises a particular molar ratio of the functional groups of the crosslinking agent V to the groups of binder B that are reactive toward the crosslinking agent V. This ensures that crosslinking of the composition of the invention is sufficient. It is therefore advantageous if the molar ratio of the functional groups of the crosslinking agent V, especially of the NCO groups or carbodiimide groups, to the sum of the groups of the at least one binder B, especially hydroxyl groups or anionic groups, that are reactive toward the functional groups of the crosslinking agent V is 0.4:1 to 1:1, preferably 0.65:1 to 0.85:1, more particularly 0.7:1 to 0.8:1.

Depending on the particular binders B and crosslinking agents V present in the composition of the invention, the composition of the invention is configured as a one-component system or is obtainable by mixing two (two-component system) or more (multicomponent system) components. In thermochemically curable one-component systems, the components to be crosslinked, in other words binder and crosslinking agent, are present alongside one another, in other words in one component. A condition for this is that the components to be crosslinked react with one another effectively only at relatively high temperatures, of more than 100° C., for example, so as to prevent premature at least proportional thermochemical curing. Such a combination may be exemplified by hydroxy-functional polyesters and/or polyurethanes with melamine resins and/or blocked polyisocyanates as crosslinking agents.

In thermochemically curable two-component or multi-component systems, the components to be crosslinked, in other words binders and the crosslinking agents, are present separately from one another in at least two components, which are not combined until shortly before the application. This form is selected when the components to be crosslinked react with one another effectively even at ambient temperatures or slightly elevated temperatures of, for example, 40 to 90° C. Such a combination may be exemplified by hydroxy-functional polyesters and/or polyurethanes and/or poly(meth)acrylates with free polyisocyanates as crosslinking agents.

Where the composition of the invention is obtainable by mixing two or more components, the weight ratio of the binder-containing component to the crosslinker-containing component is preferably 100:10 to 100:100, more preferably from 100:20 to 100:80, more particularly from 100:50 to 100:70. The use of the above-described mixing ratios ensures sufficient crosslinking of the composition and in that way provides an assurance of ready demoldability and also high adhesion to the surface of the component produced.

Crosslinking Catalyst VK (g):

Furthermore, it may be advantageous in accordance with the invention if the composition comprises at least one crosslinking catalyst VK. The crosslinking catalyst VK is present especially when the composition comprises at least one crosslinking agent V, more particularly polyisocyanates.

The crosslinking catalyst VK serves primarily to catalyze the reaction between the functional groups of the crosslinking agent V and the groups of the at least one binder B that are reactive toward the functional groups of the crosslinking agent V.

The crosslinking catalyst is preferably selected from the group of the bismuth carboxylates.

It is preferred in this context in accordance with the invention if specific bismuth carboxylates are present. The bismuth carboxylates therefore preferably possess the general formula (III)

$$Bi[OOC(C_nH_{2n+1})]_3 \quad (III)$$

where n=5 to 15, preferably n=7 to 13, more particularly n=9 to 11.

The carboxylate radicals are preferably branched, and very preferably they have a tertiary or quaternary, preferably quaternary, carbon atom in the alpha-position to the carbon atom of the carboxylate group. Among the bismuth carboxylates, bismuth trineodecanoate in particular has emerged as being especially suitable.

The bismuth carboxylates are preferably used in stabilized form in combination with the parent carboxylic acid of the carboxylate, $HOOC(C_nH_{2n+1})$, in which n possesses the definition indicated above. The free carboxylic acid here should formally not be regarded, for the purposes of this invention, as a constituent of the crosslinking catalyst VK, even if it may have not only the stabilizer effect but also, optionally, may serve as a catalysis promoter; instead, it is included among the further additives as described below.

The composition preferably comprises the at least one crosslinking catalyst VK in a particular total amount. It is therefore preferred in accordance with the invention if the at least one crosslinking catalyst VK is present in a total amount of 0.01 wt % to 3.5 wt %, preferably of 0.1 to 2 wt %, more particularly of 0.4 to 1.5 wt %, based in each case on the total weight of the composition.

Further Constituents (h):

Besides the above-recited constituents, the composition of the invention may comprise further constituents. Examples of further constituents are additives.

The at least one additive is preferably selected from the group consisting of wetting agents and/or dispersants, rheological assistants, flow control agents, UV absorbers, and mixtures thereof.

The at least one additive is present preferably in a total amount of 0 wt % to 10 wt %, based on the total weight of the composition.

Process of the Invention:

A second subject of the present invention is a process for producing a coated molding, by
(A) applying a pigmented composition of the invention to a surface of a molding tool to form a coating material film,
(B) flashing the coating material film,
(C) applying a composition forming the component to the flashed coating material film,
(D) crosslinking the composition and the coating material film, and
(E) subsequently removing the coated component.

The component in question is preferably a component made of foam. The foams herein include, among others, elastomeric foams, more particularly flexible foams, but also thermoset foams, more particularly rigid foams.

The foams may be open-cell, closed-cell or mixed-cell foams. The foams herein also include those known as integral foams.

Particularly preferred foams are polyurethane foams. These are customarily produced from one or more polyols and one or more polyisocyanates. The blowing agent added to the polyol component to form the foam is usually water, which reacts with a part of the polyisocyanate to form carbon dioxide, the reaction therefore being accompanied by foaming. Soft to elastic foams, especially flexible foams, are obtained using long-chain polyols. If short-chain polyols are used, highly crosslinked structures are generally formed, leading generally to the formation of rigid foams. The polyols used in producing the polyurethane foams preferably comprise polyester polyols, polyether polyols and/or polyester polyether polyols, and are accordingly selected preferably from the group of the aforesaid polyols.

Fibers as well may be admixed to the foam formulations. When such formulations are foamed, the products are known as fiber-reinforced foams. Fibers are preferably used when producing rigid foams.

The coating of the components, more particularly foams, takes place during the formation of the components. For this purpose, first of all, in process step (A), the composition of the invention is applied to all surfaces of a molding tool, preferably by squirting or spraying, pneumatically or electrostatically, for example. If the composition of the invention is a two-component composition, provision may be made for both components to be fed to the molding tool via separate feed lines. The two components, during their feeding, preferably possess temperatures of between 15 and 70° C., more preferably 15 to 40° C., more particularly 20 to 30° C. Feeding may take place under pressure.

In process step (B), the film of coating material formed is flashed. The flashing time is preferably less than 2 min, more preferably less than 1 min, and very preferably less than 30 s. In this case it is advantageous if the molding tool possesses a temperature of 20 to 100° C., more preferably 30 to 90° C., very preferably 40 to 80° C., more particularly 50 to 70° C. The dry film thickness is preferably 20 to 120 μm, more preferably 25 to 100 μm. During the flashing phase, the solvent L is removed from the composition, but there is not any complete curing or crosslinking of the composition.

In process step (C), a composition forming the component is sprayed onto the flashed film of coating material. This may take place in an open or closed process. In the case of the open process, overmolding with shaping material is carried out. In the case of the closed process, which is preferred, the molding tool is closed after the film of coating material has been flashed, and then the composition for forming the component is introduced, preferably by injection.

In process step (D), the coating material film and also the composition forming the component are crosslinked. The reaction time varies in general in the range from 1 to 8 min, typically 2 to 6 min, at a molding tool temperature in the range from preferably 45 to 75° C., more preferably 50 to 70° C., very preferably 52 to 65° C.

When reaction has taken place to form the component, and the coating has cured, the component formed is coated with a coating of the crosslinked composition of the invention and can be removed from the molding tool in process step (E). The coated components exhibit high accuracy of hue, of a level comparable with automotive OEM finishing. Moreover, a high level of hue stability is achieved, and there is no stress whitening and no uneven covering of edges of the component. Moreover, higher levels of hue intensity and of hue diversity are achieved than in the case of coloring of the foam material. Lastly, the components produced also exhibit high homogeneity of hue.

The coated components may be used in numerous areas. Examples include the interior and exterior of motor vehicles, more particularly as seat cushions or as mud flaps, steering wheels, sill trims or fender trims, or else as footwear soles, or in the area of furniture and furniture upholstery.

The coated component may if desired be coated directly—without a sanding operation, and optionally after simple cleaning—with further coating materials such as, for example, one or more basecoat materials and/or one or more clearcoat materials, to form one or more basecoat films and/or one or more clearcoat films. Preferably no primer-surfacer coat is applied to the component coated in accordance with the invention; instead, a basecoat film and/or a topcoat film, more particularly a clearcoat film, is applied directly. Basecoat and topcoat materials, especially clearcoat materials, which can be used are in principle all basecoat and clearcoat materials, respectively, that are conventionally used in OEM finishing or in refinishing. Such basecoat and clearcoat materials are available, for example, from BASF Coatings GmbH, with clearcoat materials that have proven themselves particularly well being those, in particular, from the EverGloss product line.

With regard to further preferred embodiments of the process of the invention, particularly in relation to the composition used in the process, the comments made above regarding the pigmented composition of the invention are valid mutatis mutandis.

Inventive Use:

Lastly, a further subject of the present invention is the use of the pigmented compositions of the invention for producing coated components, more particularly coated foams.

The pigmented composition of the invention and also use thereof in the process of the invention permit the production of coated components which can be further-processed without costly and inconvenient aftertreatment. Even without recoating, the coating obtained on the component by the composition is highly elastic or flexible and also UV-stable and nonshiny, with the consequence not only of damage-free demolding of the coated component but also of effective protection of the coated component produced with respect to environmental effects, such as UV radiation, soiling or the like, as early as directly after the production of the coated component. Since at the same time the composition of the invention has a release effect, this material can be used both as release agent and as coating material. There is therefore no need to use a separate release agent, one which has to be removed, at cost and inconvenience, before the component is aftertreated. Moreover, the coated components produced have a regular surface even if produced using foams which, in combination with conventional release agents, lead to components having a very irregular surface. Because only small residues of the composition remain in the molding tool, the molding tools used do not have to be cleaned before every further application of the composition. In comparison to the coloring of the material used for producing components, or to the vacuum film process, the inventive use results in greater hue accuracy, hue stability, hue intensity, hue diversity, and hue homogeneity.

A final subject of the present invention is the use of the composition of the invention for improving the flow behavior of compositions used for producing components.

The use of the coating material composition of the invention for producing coated components leads, surprisingly, to an improvement in the flow behavior of compositions used for producing the components. In this way it is possible to carry out defect-free production even of components having complex geometries, since the coating of the molding tools with the composition of the invention increases the flow behavior of the compositions used for producing the components and in this way also permits the filling, more particularly complete filling, of angular or narrow cavities of the molding tool.

With regard to further preferred embodiments of the inventive use, particularly in relation to the composition used, the comments made above regarding the composition of the invention and also the process of the invention are valid mutatis mutandis.

The invention is described in particular by the following embodiments:

According to a first embodiment, the present invention relates to a composition, more particularly coating material composition, comprising
(a) at least one solvent L,
(b) at least one compound of the general formula (I)

$$R^1(C{=}O)_r{-}O{-}(AO)_s{-}R^2 \qquad (I)$$

in which $R^1$ is a saturated or unsaturated, aliphatic hydrocarbon radical having 6 to 30 carbon atoms, $R^2$ is H, a $PO(OH)_2$ radical, or the optionally partially phosphated radical of a monosaccharide or disaccharide, or the optionally partially phosphated radical of an alditol, AO stands for one or more alkylene oxide radicals selected from the group consisting of ethylene oxide, propylene oxide and butylene oxide, r is 0 or 1, and s is 0 to 30;

(c) optionally at least one polyether-modified alkylpolysiloxane, (d) at least one polysiloxane of the general formula (II)

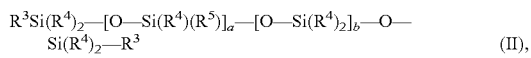
(II), in which $R^3$ and $R^4$, in each case independently of one another, are a methyl group or a $(HO-CH_2)_2-C(CH_2-CH_3)-CH_2-O-(CH_2)_3-$* radical, $R^5$ is a methyl group, a is 0 or 1 to 10, and b is 3 to 30;

(e) at least one color base BF, and (f) optionally at least one binder B.

According to a second embodiment, the present invention relates to a composition according to embodiment 1, wherein said composition has a solids content of 30 to 60 wt %, preferably of 35 to 55 wt %, more preferably of 40 to 50 wt %, more particularly of 42 to 48 wt %, based in each case on the total weight of the composition and measured according to ASTM D2369 (2015) (110° C., 60 min).

According to a third embodiment, the present invention relates to a composition according to either of embodiments 1 and 2, wherein said composition has a viscosity of 10 to 60 s, more particularly of 20 to 30 s (DIN4 flow cup), measured according to DIN 53211 (March 2012).

According to a fourth embodiment, the present invention relates to a composition according to any of the preceding embodiments, wherein the at least one solvent L is selected from organic solvents, water, and mixtures thereof and is present in a total amount of 40 to 70 wt %, more preferably 45 to 65 wt %, and very preferably 50 to 60 wt %, more particularly 52 to 58 wt %, based in each case on the total weight of the composition.

According to a fifth embodiment, the present invention relates to a composition according to any of the preceding embodiments, wherein, in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or disaccharide, or the optionally partially phosphated radical of an alditol, more particularly of sorbitol, AO stands for one or more alkylene oxide radicals selected from the group consisting of ethylene oxide and propylene oxide, r is 0 or 1, and s is 0 or 1 to 25.

According to a sixth embodiment, the present invention relates to a composition according to any of the preceding embodiments, wherein, in the general formula (I), $R^1$ is a saturated or unsaturated, aliphatic hydrocarbon radical having 10 to 24 carbon atoms, $R^2$ is H, a $PO(OH)_2$ radical, or the optionally partially phosphated radical of a monosaccharide or the optionally partially phosphated radical of an alditol, more particularly of sorbitol, AO stands for one or more alkylene oxide radicals selected from the group consisting of ethylene oxide and propylene oxide, and the ethylene oxide fraction in the entirety of the radicals AO is at least 70 mol %, r is 0 or 1, and s is 0 or s is 6 to 20.

According to a seventh embodiment, the present invention relates to a composition according to any of the preceding embodiments, wherein the at least one compound of the general formula (I) is present in a total amount of 0.1 to 10 wt %, more preferably 0.5 to 5 wt %, more particularly 1.5 to 4 wt %, based in each case on the total weight of the composition.

According to an eighth embodiment, the present invention relates to a composition according to any of the preceding embodiments, wherein the polyether-modified alkylpolysiloxane comprises at least one structural unit $(R^7)_2(OR^6)SiO_{1/2}$ and at least one structural unit $(R^7)_2SiO_{2/2}$, where $R^6$ is an ethylene oxide, propylene oxide, and butylene oxide group, more particularly a mixture of ethylene oxide and propylene oxide and butylene oxide groups, and $R^7$ is a $C_1$-$C_{10}$ alkyl group, more particularly a methyl group.

According to a ninth embodiment, the present invention relates to a composition according to embodiment 8, wherein the polyether-modified alkylpolysiloxane has a molar ratio of siloxane to ethylene oxide groups to propylene oxide groups to butylene oxide groups of 6:21:15:1 to 67:22:16:1.

According to a tenth embodiment, the present invention relates to a composition according to either of embodiments 8 and 9, wherein the polyether-modified alkylpolysiloxane has a molar ratio of the structural unit $(R^7)_2(OR^6)SiO_{1/2}$ to the structural unit $(R^7)_2SiO_{2/2}$ of 1:10 to 1:15, more particularly of 1:10 to 1:13.

According to an eleventh embodiment, the present invention relates to a composition according to any of the preceding embodiments, wherein the at least one polyether-modified alkylpolysiloxane is present in a total amount of 0 wt % or of 0.1 to 6 wt %, preferably 0.5 to 4 wt %, more particularly 0.8 to 3 wt %, based in each case on the total weight of the composition.

According to a twelfth embodiment, the present invention relates to a composition according to any of the preceding embodiments, wherein, in the general formula (II), the radical $R^3$ is a $(HO-CH_2)_2-C(CH_2-CH_3)-CH_2-O-(CH_2)_3-$* radical, the radical $R^4$ is a methyl group, the radical $R^5$ is a methyl group, a is 0, and b is 7 to 14.

According to a thirteenth embodiment, the present invention relates to a composition according to any of the preceding embodiments, wherein said composition comprises the at least one polysiloxane of the general formula (II) in a total amount of 0.1 to 5 wt %, preferably 0.5 to 4 wt %, more particularly 0.8 to 2.5 wt %, based in each case on the total weight of the composition.

According to a fourteenth embodiment, the present invention relates to a composition according to any of the preceding embodiments, wherein the at least one color base BF is present in a total amount of 5 to 40 wt %, more particularly of 10 to 20 wt %, based on the total weight of the composition.

According to a fifteenth embodiment, the present invention relates to a composition according to any of the preceding embodiments, wherein the color base BF comprises at least one effect pigment and/or at least one coloring pigment, preferably in a total amount of 0.5 to 70 wt %, based on the total weight of the color base BF.

According to a sixteenth embodiment, the present invention relates to a composition according to embodiment 15, wherein the at least one effect pigment (a1) is selected from the group of platelet-shaped metallic effect pigments, pearlescent pigments, metal oxide-mica pigments, platelet-shaped graphite, platelet-shaped iron oxide, multilayer effect pigments from PVD films, liquid crystal polymer pigments, and mixtures thereof, more particularly from platelet-shaped aluminum pigments and/or coated metal oxide-mica pigments and/or metal oxide-coated borosilicates.

According to a seventeenth embodiment, the present invention relates to a composition according to either of the embodiments 15 and 16, wherein the at least one coloring pigment (a1) is selected from the group of white pigments, black pigments, chromatic pigments, monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, aniline black, and mixtures thereof.

According to an eighteenth embodiment, the present invention relates to a composition according to any of the preceding embodiments, wherein the color base BF comprises at least one binder selected from the group of polyurethane polymers, amino resin polymers, polyacrylate polymers, polyester polymers, and mixtures thereof, especially anionically stabilized polyurethane polymers, preferably in a total amount of 10 to 80 wt %, based on the total weight of the color base BF.

According to a nineteenth embodiment, the present invention relates to a composition according to embodiment 18, wherein the anionically stabilized polyurethane polymer is obtainable by reaction of an NCO prepolymer with a modifier in the form of a polyol, more particularly trimethylolpropane, the NCO prepolymer being obtainable by reaction of
  (i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, the polyester polyol preferably containing no olefinic double bonds,
  (ii) 3 to 7 wt %, based on the total weight of the compounds (i) to (iv), of at least one alkanoic acid having 3 to 8 carbon atoms and also two hydroxyl groups on the carbon atom in alpha-position, more particularly dimethylolpropionic acid,
  (iii) 0.5 to 3 wt %, based on the total weight of the compounds (i) to (iv), of at least one $C_3$-$C_8$ alkanediol, more particularly 1,6-hexanediol, and
  (iv) 25 to 30 wt %, based on the total weight of the compounds (i) to (iv), of at least one diisocyanate of the formula (IV) where X=dicyclohexylmethyl radical and $R_3$=$R_4$=hydrogen,
where the equivalent ratio of NCO prepolymer to modifier is between 2.0:1.0 and 1.0:2.0, more particularly between 1.1:1 and 1:1.1.

According to a twentieth embodiment, the present invention relates to a composition according to either of the embodiments 17 and 18, wherein the anionically stabilized polyurethane polymer has a degree of neutralization of 50% to 100%, preferably of 60% to 80%.

According to a twenty-first embodiment, the present invention relates to a composition according to any of the preceding embodiments, wherein the at least one binder B is present in a total amount (solids content) of 20 to 50 wt %, preferably of 25 to 40 wt %, more particularly of 25 to 35 wt %, based in each case on the total weight of the composition.

According to a twenty-second embodiment, the present invention relates to a composition according to any of the preceding embodiments, wherein the binder B is selected from the group consisting of (i) poly(meth)acrylates, more particularly hydroxy-functional and/or carboxylate-functional and/or amine-functional poly(meth)acrylates, (ii) polyurethanes, more particularly hydroxy-functional and/or carboxylate-functional and/or amine-functional polyurethanes, (iii) polyesters, more particularly polyester polyols, (iv) polyethers, more particularly polyether polyols, (v) copolymers in the stated polymers, and (vi) mixtures thereof.

According to a twenty-third embodiment, the present invention relates to a composition according to embodiment 22, wherein the binder B is selected from hydroxy-functional poly(meth)acrylates and/or polyester polyols, more particularly from a mixture of at least one hydroxy-functional poly(meth)acrylate and at least one polyester polyol.

According to a twenty-fourth embodiment, the present invention relates to a composition according to either of the preceding embodiments 22 and 23, wherein the hydroxy-functional poly(meth)acrylate has a hydroxyl number of 50 to 120 mg KOH/g, preferably of 70 to 95 mg KOH/g, more particularly of 75 to 90 mg KOH/g or of 80 to 85 mg KOH/g.

According to a twenty-fifth embodiment, the present invention relates to a composition according to any of the preceding embodiments 22 to 24, wherein the hydroxy-functional poly(meth)acrylate has an acid number of 1 to 20 mg KOH/g, more particularly 6 to 14 mg KOH/g or 8 to 12 mg KOH/g, and/or possesses a number-average molecular weight $M_n$ of 4000 to 10 000 g/mol, preferably 5000 to 9000 g/mol, more preferably 5500 to 8000 g/mol, more particularly 6000 to 7500 g/mol.

According to a twenty-sixth embodiment, the present invention relates to a composition according to any of the preceding embodiments 22 to 25, wherein the hydroxy-functional poly(meth)acrylate has a hydroxyl functionality of 5 to 15, preferably of 6 to 14, more particularly of 8 to 12.

According to a twenty-seventh embodiment, the present invention relates to a composition according to any of the preceding embodiments 22 to 26, wherein the hydroxy-functional poly(meth)acrylate is preparable by reaction of
  (a1) at least one hydroxy-functional (meth)acrylic ester, more particularly (meth)acrylic ester of the formula $HC=CR^x-COO-R^y-OH$, in which $R^x$ is H or $CH_3$ and $R^y$ is an alkylene radical having 2 to 6, preferably 2 to 4, more preferably 2 or 3 carbon atoms,
  (a2) at least one carboxy-functional ethylenically unsaturated monomer, more particularly (meth)acrylic acid, and
  (a3) at least one hydroxyl-free and carboxyl-free ester of (meth)acrylic acid and/or at least one hydroxyl-free and carboxyl-free vinyl monomer, more particularly styrene.

According to a twenty-eighth embodiment, the present invention relates to a composition according to embodiment 27, wherein the carboxy-functional ethylenically unsaturated monomer (a2), more particularly (meth)acrylic acid, is present in a total amount of 20 to 45 wt %, preferably of 25 to 40 wt %, more particularly of 30 to 35 wt %, based in each case on the total weight of all the monomers used in preparing the hydroxy-functional poly(meth)acrylate.

According to a twenty-ninth embodiment, the present invention relates to a composition according to either of the preceding embodiments 27 and 28, wherein the vinyl monomer (a3), more particularly styrene, is present in a total amount of 30 to 60 wt %, preferably of 35 to 55 wt %, more particularly of 40 to 50 wt %, based in each case on the total weight of all the monomers used in preparing the hydroxy-functional poly(meth)acrylate.

According to a thirtieth embodiment, the present invention relates to a composition according to any of the preceding embodiments 22 to 29, wherein the hydroxy-functional poly(meth)acrylate is present in a total amount of 10 wt % to 97 wt %, preferably of 40 to 70 wt %, more particularly of 40 to 50 wt %, based in each case on the total weight of the solids content of all binders present in the composition.

According to a thirty-first embodiment, the present invention relates to a composition according to any of the preceding embodiments 22 to 30, wherein the polyester polyol has a hydroxyl number of 100 to 200 mg KOH/g, preferably of 110 to 180 mg KOH/g, more particularly of 120 to 160 mg KOH/g.

According to a thirty-second embodiment, the present invention relates to a composition according to any of the preceding embodiments 22 to 31, wherein the polyester polyol has an acid number of 0 to 9 mg KOH/g, more particularly 0.2 to 2 mg KOH/g, and/or possesses a number-average molecular weight of 800 to 3000 g/mol, preferably 1000 to 2000 g/mol, more particularly of 1000 to 1600 g/mol.

According to a thirty-third embodiment, the present invention relates to a composition according to any of the preceding embodiments 22 to 32, wherein the polyester polyol is branched.

According to a thirty-fourth embodiment, the present invention relates to a composition according to any of the preceding embodiments 22 to 33, wherein the polyester polyol has a hydroxyl functionality of 2.2 to 4, preferably of 2.5 to 3.6, more particularly of 2.7 to 3.6.

According to a thirty-fifth embodiment, the present invention relates to a composition according to any of the preceding embodiments 22 to 34, wherein the polyester polyol is present in a total amount of 40 wt % to 97 wt %, preferably of 40 to 70 wt %, more particularly of 50 to 65 wt %, based in each case on the total weight of the solids content of all binders present in the composition.

According to a thirty-sixth embodiment, the present invention relates to a composition according to any of the preceding embodiments, wherein said composition additionally comprises at least one crosslinking agent V.

According to a thirty-seventh embodiment, the present invention relates to a composition according to embodiment 36, wherein the crosslinking agent V is selected from the group consisting of amino resins, polyisocyanates, blocked polyisocyanates, polycarbodiimides, UV light, heat, photoinitiators, and mixtures thereof.

According to a thirty-eighth embodiment, the present invention relates to a composition according to embodiment 37, wherein the polyisocyanate possesses an NCO group functionality of greater than 2.4 to 5, preferably 2.6 to 4, more preferably 2.8 to 3.6.

According to a thirty-ninth embodiment, the present invention relates to a composition according to either of the preceding embodiments 37 and 38, wherein the polyisocyanate comprises at least one isocyanurate ring or at least one iminooxadiazinedione ring.

According to a fortieth embodiment, the present invention relates to a composition according to either of the preceding embodiments 37 and 38, wherein two polyisocyanates different from one another are present, the first polyisocyanate comprising at least one isocyanurate ring and the second polyisocyanate comprising at least one iminooxadiazinedione ring.

According to a forty-first embodiment, the present invention relates to a composition according to any of the preceding embodiments 36 to 40, wherein the at least one crosslinking agent V is present in a total amount of 10 wt % to 40 wt %, preferably of 10 to 30 wt %, more particularly of 15 to 25 wt %, based in each case on the total weight of the composition.

According to a forty-second embodiment, the present invention relates to a composition according to any of the preceding embodiments 22 to 41, wherein the molar ratio of the functional groups of the crosslinking agent V, more particularly of the NCO groups or carbodiimide groups, to the sum of the groups in the at least one binder B, more particularly hydroxyl groups, that are reactive toward the functional groups of the crosslinking agent V is 0.4:1 to 1:1, preferably 0.65:1 to 0.85:1, more particularly 0.7:1 to 0.8:1.

According to a forty-third embodiment, the present invention relates to a composition according to any of the preceding embodiments, wherein said composition additionally comprises at least one crosslinking catalyst VK.

According to a forty-fourth embodiment, the present invention relates to a composition according to embodiment 43, wherein the crosslinking catalyst VK is selected from the group of the bismuth carboxylates.

According to a forty-fifth embodiment, the present invention relates to a composition according to embodiment 44, wherein the crosslinking catalyst VK from the group of the bismuth carboxylates has the general formula (III)

$$Bi[OOC(C_nH_{2n+1})]_3 \qquad (III)$$

where n=5 to 15, preferably n=7 to 13, more particularly n=9 to 11.

According to a forty-sixth embodiment, the present invention relates to a composition according to any of the preceding embodiments 43 to 45, wherein the at least one crosslinking catalyst VK is present in a total amount of 0.01 wt % to 3.5 wt %, preferably of 0.1 to 2 wt %, more particularly of 0.4 to 1.5 wt %, based in each case on the total weight of the composition.

According to a forty-seventh embodiment, the present invention relates to a composition according to any of the preceding embodiments, wherein said composition additionally comprises at least one pigment and/or at least one filler.

According to a forty-eighth embodiment, the present invention relates to a composition according to any of the preceding embodiments, wherein at least one additive selected from the group consisting of wetting agents and/or dispersants, rheological assistants, flow control agents, UV absorbers, and mixtures thereof is additionally present.

According to a forty-ninth embodiment, the present invention relates to a composition according to embodiment 48, wherein the at least one additive is present in a total amount of 0 wt % to 10 wt %, based on the total weight of the composition.

According to a fiftieth embodiment, the present invention relates to a process for producing a coated component by
(A) applying a composition according to any of embodiments 1 to 49 to a surface of a molding tool to form a coating material film,
(B) flashing the coating material film,
(C) applying a composition forming the component to the flashed coating material film, (D) crosslinking the composition and the coating material film, and (E) subsequently removing the coated component.

According to a fifty-first embodiment, the present invention relates to a process according to embodiment 50, wherein the coated component is in the form of a component for the interior or exterior of motor vehicles, as a seat cushion, mud flap, steering wheel, sill trim or fender trim, footwear sole, furniture component or furniture upholstery.

According to a fifty-second embodiment, the present invention relates to a process according to either of embodiments 50 and 51, wherein the cured coating material film, without an intermediate sanding operation, is coated with at least one basecoat film and/or at least one clearcoat film, and the basecoat film(s) and clearcoat film(s) are separately or jointly cured.

According to a fifty-third embodiment, the present invention relates to the use of a composition according to any of embodiments 1 to 49 for producing coated components, more particularly coated foams.

According to a fifty-fourth embodiment, the present invention relates to the use of a composition according to any of embodiments 1 to 49 for improving the flow behavior of compositions used for producing components.

EXAMPLES

Description of Methods

1. Solids Content (Solids, Nonvolatile Fraction)

The nonvolatile fraction is determined according to ASTM D2369 (date: 2015). In this procedure, 2 g of sample are weighed out into an aluminum dish which has been dried beforehand, and the sample is dried in a drying cabinet at 110° C. for 60 minutes, cooled in a desiccator, and then reweighed. The residue, relative to the total amount of sample introduced, corresponds to the nonvolatile fraction.

2. Determination of Demolding Energy

In this case an adhesive strip (TESA 4651; see Tesa datasheet) with dimensions of 2.5×4 cm is bonded to the upper side of a molding tool. Beforehand at one end the adhesive tape is folded over once to give a loop, through which a hole is drilled. The spring balance is suspended in this hole. Using a scalpel, the coating film is cut through around the adhesive tape, to give a defined area of 10 cm². The removal direction is orthogonal to the molding tool.

3. Capacity for Further Processing

The respective release agent composition was applied to a molding tool surface at 55° C. Directly after the end of application, a fingertip was used to dab the liquid release agent composition in a 5-second cycle, as far as possible uniformly/with constant pressure. The respective release agent composition had capacity for further processing as soon as it had fully dried but could not be detached from the molding tool.

4. Determination of Acid Number

The acid number is determined according to DIN EN ISO 2114 (date: June 2002), using "method A". The acid number corresponds to the mass of potassium hydroxide in mg required to neutralize 1 g of sample under the conditions specified in DIN EN ISO 2114. The acid number reported corresponds here to the total acid number as specified in the DIN standard, and is based on the solids content.

5. Determination of OH Number

The OH number is determined according to DIN 53240-2. The OH groups are reacted by acetylation with an excess of acetic anhydride. The excess acetic anhydride is subsequently split by addition of water to form acetic acid, and the entire acetic acid is back-titrated with ethanolic KOH. The OH number indicates the quantity of KOH in mg that is equivalent to the amount of acetic acid bound in the acetylation of 1 g of sample. The OH number is based on the solids content of the sample.

6. Determination of Number-Average and Weight-Average Molecular Weight

The number-average molecular weight ($M_n$) is determined by gel permeation chromatography (GPC) according to DIN 55672-1 (March 2016). Besides the number-average molecular weight, this method can also be used to determine the weight-average molecular weight ($M_w$) and also the polydispersity d (the ratio of weight-average molecular weight ($M_w$) to number-average molecular weight ($M_n$)). Tetrahydrofuran is used as the eluent. The determination is made against polystyrene standards. The column material consists of styrene-divinylbenzene copolymers.

Working Examples

The inventive and comparative examples hereinafter serve to elucidate the invention, but should not be interpreted as imposing any limitation.

With regard to the stated formulation constituents and their quantities, the following should be borne in mind: any reference to a commercial product is to exactly that commercial product, irrespective of the particular principal name selected for the constituent.

1. Release Agent Compositions Used

The coating material compositions Z1 to Z5 are each obtained by homogeneous mixing of the constituents reported in table 1.

TABLE 1

| | Compositions used | | | |
|---|---|---|---|---|
| | Z1 | Z2* | Z3 | Z4* |
| Parocryl 4085[1)] | 108.9 | 201.5 | 201.5 | 50.38 |
| Desmophen 670 BA[2)] | 108.9 | 201.5 | 201.5 | 352.62 |
| 1-Methoxy-2-propyl acetate | 201.1 | 213.0 | 213.0 | 213.0 |
| Additive MI-8010[3)] | — | 23.5 | 23.5 | 23.5 |
| Borchi Gol OL17[4)] | — | 9.50 | 9.50 | 9.50 |
| Silmer OHT Di-10[5)] | — | 4.50 | 4.50 | 4.50 |
| Tinuvin 1130[6)] | 2.43 | 4.50 | 4.50 | 4.50 |
| Butyl acetate | 15.7 | 29.0 | 29.0 | 29.0 |
| K-Kat XK-651[7)] | 7.03 | 7.03 | 7.03 | 7.03 |
| Desmodur N 3800[8)] | 154.0 | 154.0 | 154.0 | 154.0 |
| Color base BF[9)] | 89.12 | 169.6 | — | 169.6 |

*inventive
[1)]hydroxyl-functional poly(meth)acrylate having a hydroxyl number of 82.5 mg KOH/g, an acid number of 10 mg KOH/g, $M_n$ about 6800 g/mol, $M_w$ about 17 000 g/mol (BASF SE),
[2)]polyester polyol having a hydroxyl number of 115 mg KOH/g and a hydroxyl functionality of about 3.5 (Covestro),
[3)]mixture of compounds of the formula $R^1$—(C═O)$_r$—O-(AO)$_s$—$R^2$, composed of (a) $R^1$ = mixture of saturated and unsaturated hydrocarbon radicals having 12 to 22 carbon atoms, r = 0, AO = mixture of primarily ethylene oxide units and a few propylene oxide units, and $R^2$ = H ($M_n$ ≈ 650 g/mol); and (b) $R^1$ = unsaturated hydrocarbon radical having 21 carbon atoms, s = 0, and $R^2$ = H (Münch Chemie International GmbH),
[4)]polyether-modified methylpolysiloxane (Borchers GmbH),
[5)]hydroxy-modified polysiloxane of the formula (III) with the above-recited radicals (Siltec GmbH & Co. KG),
[6)]UV absorber (BASF Corporation),
[7)]bismuth neodecanoate (King Industries),
[8)]hexamethylene diisocyanate trimer of isocyanurate type with an NCO content of 11.0 wt % (Covestro),
[9)]color base BF is selected from 55-M 1 1 L Effect Additive, 55-A 098 0.5 L stone white, 55-M 141 0.5 L yellow, 55-M 306 1 L rust red, 55-A 556 1 L ocean blue 2, 55-A 640 1 L blue-green, 55-A 974 1 L tinting black, 55-M 99-21 1.0 L crystal silver coarse, 55-M 800 1 L pearl red-brown.

2. Determination of Adhesive Force of the Release Agent Composition on the Surface of a Molding Tool The adhesive force is determined as described above. The results are reproduced in table 2.

TABLE 2

Adhesive force of the compositions on a molding tool

|     | Adhesive force [N] |
| --- | --- |
| Z1  | 5** |
| Z2* | 0.5 |
| Z3  | 0.5 |

*inventive
**delamination

Composition Z1, not inventive, could not be separated from the molding tool, since the adhesive tape underwent delamination at 5 newtons. In contrast, inventive composition Z2 exhibits high demoldability even without the use of an additional, external release agent. Furthermore, the addition of the at least one color base BF does not lead to an increase in the adhesive force, and so the ready demoldability of the composition is not adversely affected by the pigmentation (cf. compositions Z2 and Z3).

3. Determination of Further-Processing Time

The further-processing time is determined as described above. The results are reproduced in table 3.

TABLE 3

Further-processing time of the release agent compositions

|     | Further-processing time [s] |
| --- | --- |
| Z1  | 30 |
| Z2* | 25 |
| Z3  | 25 |

*inventive

From table 3 it is apparent that the inventive composition Z2 has a lower flashing time than the noninventive composition Z1. Moreover, adding the color base BF has no adverse effect on the flashing time (cf. compositions Z2 and Z3). These short flashing times permit short operating times for process step (B) and hence an efficient process regime.

4. Production and Testing of Coated Components 4.1 Production of Coated Components The inventive coating material compositions Z2 and Z4 and also a noninventive coating composition Z3 were each manually applied pneumatically (SATA Jet 4000 B HVLP with nozzle 1.0) to the surface of a molding tool in plate form (the mold consists of an aluminum alloy; plate size: 200 mm×200 mm×20 mm, unstructured). The mold temperature was 55° C. or 65° C. Then the coating material films were flashed (flashing time: 20 to 25 s; dry film thickness: about 80 μm (by light microscopy)).

After the flashing, the molding tools were closed and a polyester-based polyurethane foam system was injected. This system is obtainable by mixing an A component (containing 100 wt % of polyol mixture 270/40[1]) and also 10.6 wt % of Elastopan S 7429/155 catalyst[2]) with a B component (containing Iso 187/68[3]) in a ratio of 100:84.

The foam density is 280 to 320 kg/m$^3$. In the case of composition Z3, the one foam system with blue pigmentation was used.

[1] Polyester polyol mixture having an OH number of 51 mg KOH/g (BASF Italia S.p.A.)

[2] Isocyanate based on 4,4'-diphenylmethane diisocyanate, with an NCO content of 18.7% (BASF Italia S.p.A.)

[3] Mixture of aliphatic tertiary amines, glycols, and stabilizers, having a water content of 3.9 wt % (BASF Italia S.p.A.)

The curing of the film of coating material and also the formation of the polyurethane foam took place over a period of 4 minutes in the closed mold at 55° C. or 65° C.

After the 4-minute cure time has elapsed, the coated foam can be removed from the tool manually, easily and completely, without assistants. The surface of the coating had the mattness required in the footwear industry.

4.2 Ross Flex Test

Using each of the components produced above and coated with inventive compositions Z2 and Z4, the Ross flex test according to ASTM D1052:2009 was carried out, with a flex angle of 60°. The test was carried out in each case over 100 000 cycles, with the components being inspected after 50 000 cycles and then after each further 10 000 cycles for the presence of damage to the surface of the coating.

Even after 100 000 cycles, the components coated with inventive compositions Z2 and Z5 did not show any surface damage. Accordingly, the coatings achieved with the compositions not only lead to outstanding demoldability of the components after their production, but also exhibit high adhesion to the components and high flexibility. The pigmented coating, therefore, is also extremely robust and therefore does not lead to stress whitening, of the kind occurring in the vacuum foil process, for example.

4.3 Rub Fastness

The rub fastness of the components coated with inventive compositions Z2 and Z4 was tested on the basis of DIN EN ISO 11640:2017-05. For this purpose, the respective component was clamped into an SDL Atlas Crockmeter. A commercial abrasive paper of grade P280 was used to rub the lacquered side of the component, with a pressing force of 9 N, for 25 back-and-forth strokes, with a stroke length of 5 cm. The colored residue on the abrasive paper and also the surface of the coating were then inspected. While the abrasive paper did have small residues of the coating, there was no visible damage to the coating. The coating material of the invention, accordingly, leads to coatings which exhibit good rub fastness.

4.4 Migration Fastness

To investigate the migration behavior of the pigments under pressure, the 1-NOVO lacquer system was investigated in accordance with DIN EN ISO 15701:2015-07. In this case, the lacquered side of the respective component was covered with a PVC foil (to EN ISO 15701) from James Heal. The component and the PVC foil were clamped between two glass plates in a James Heal Perspirometer and weighted with a weight of 4.5 kg. The Perspirometer was subsequently stored at 50° C. for 16 hours. At the end of the storage time, the experimental set-up was dismantled again and the PVC foil was inspected for discoloration. With all the components tested, there was no discoloration of the PVC foil. The migration fastness of the coated components is therefore high.

4.5 Accuracy of Hue, Intensity of Hue

The accuracy and the intensity of hue of the components produced was assessed visually. The results obtained were as follows (rating 1: accuracy of hue comparable with OEM vehicle finishing, viz. very high hue intensity, rating 2:

accuracy of hue poorer than for OEM vehicle finishing, viz. high hue intensity, rating 3: accuracy of hue significantly poorer than for OEM vehicle finishing, viz. low intensity of hue).

| Component | Accuracy of hue | Intensity of hue |
|---|---|---|
| B1 [1] | 3 | 3 |
| B2 [2] | 1 | 1 |
| B3 [3] | 1 | 1 |

[1] Coated with coating material Z3 (not inventive)
[2] Coated with coating material Z2 (not inventive)
[3] Coated with coating material Z4 (not inventive)

As is evident from the table above, the coating of components (components B2 and B3) with the inventive compositions leads to greater accuracy of hue and intensity of hue than the pigmentation of the foam material (component B1).

4.6 Compatibility

To determine the compatibility of the coating material compositions with foam compositions used in the production of components, components were produced as described under 4.1. The components were produced using inventive release agent composition Z2, a wax-based release agent (Munch Chemie), and a silicone-based release agent (Munch Chemie). The compatibility of the release agent with the foam system used to produce the component was assessed visually, with incompatibility being manifested by bulges and indentations in the foam. The results obtained were as follows (rating 1: very good compatibility, rating 2: good compatibility, rating 3: satisfactory compatibility, rating 4: adequate compatibility).

TABLE 4

| Compatibility of the release agent compositions | |
|---|---|
| Release agent composition | Compatibility |
| Z2* | 1 |
| wax-based release agent | 3 |
| silicone-based release agent | 4 |

*inventive

From table 4 it is apparent that the inventive coating material composition exhibits very good compatibility with the foam system used for producing the components. The produced components using inventive composition Z2 have no bulges or indentations. In contrast, the noninventive release agent compositions lead to bulges and indentations during production of the components, and therefore exhibit merely satisfactory or adequate compatibility.

4.7 Effect of the Release Agent Composition on the Flow Properties of the Composition Used for Producing Components To determine the effect of the coating material compositions on the foam compositions used for producing components, components were produced as described under 4.1. The components were produced using the inventive release agent composition Z2 and also an aqueous release agent (MP6032-5, Munch Chemie). The molding tools used were a molding plate with simple geometry, a molding tool with more complex geometry, in footwear sole form, and a molding tool with angled geometry, including struts just a few millimeters wide. The demolding and the filling of the molding tool by the foam system were each assessed visually. The results obtained were as follows (rating 1: very good demolding or very high improvement in the flow properties, rating 2: good demolding or high improvement in the flow properties, rating 3: satisfactory demolding or minimal defects in the component, rating 4: adequate demolding or high number of defects in the component).

TABLE 5

| Effect of the release agent compositions on the flow properties of the foam system | | | |
|---|---|---|---|
| Molding tool | Release agent composition | Demold-ability | Effect on flow properties |
| Plate form | Z2* | 1 | 1 |
| | Aqueous release agent | 1 | 1 |
| Footwear sole | Z2* | 1-2 | 1 |
| | Aqueous release agent | 2-3 | 2 |
| Angled geometry | Z2* | 2 | 1 |
| | Aqueous release agent | 3-4 | 3 |

*inventive

From table 5 it is apparent that the inventive coating material composition leads to outstanding demoldability even when using molding tools of highly complex geometry. Using the coating material composition of the invention, moreover, the flow property of the foam system is improved, and so even narrow cavities in the molding tool can be fully filled with the foam composition. This allows the defect-free production of components of complex geometry. Conversely, the use of a noninventive release agent composition in the case of more complex molding tools leads to poorer demoldability. Moreover, the use of the noninventive release agent composition does not lead to a positive influence on the flow properties of the foam composition, and so, especially in the case of complex molding tools, defects arise due to the lack of filling of cavities.

The invention claimed is:

1. A pigmented composition, comprising
(a) at least one solvent L,
(b) at least one compound of the general formula (I)

in which $R^1$ is a saturated or unsaturated, aliphatic hydrocarbon radical having 6 to 30 carbon atoms,
$R^2$ is H, a $PO(OH)_2$ radical, or an optionally partially phosphated radical of a monosaccharide or disaccharide, or an optionally partially phosphated radical of an alditol,
AO stands for one or more alkylene oxide radicals selected from the group consisting of ethylene oxide, propylene oxide and butylene oxide,
r is 0 or 1, and s is 0 to 30;
(c) optionally at least one polyether-modified alkylpolysiloxane,
(d) at least one polysiloxane of the general formula (II)

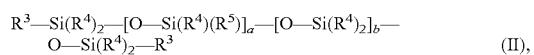

in which
$R^3$ and $R^4$, in each case independently of one another, are a methyl group or a $(HO-CH_2)_2-C(CH_2-CH_3)-CH_2-O-(CH_2)_3-$* radical,
$R^5$ is a methyl group, a is 0 or 1 to 10, and
b is 3 to 30;
(e) at least one color base BF, and
(f) optionally at least one binder B.

2. The pigmented composition as claimed in claim 1, wherein in the general formula (I), $R^1$ is a saturated or unsaturated aliphatic hydrocarbon radical having 10 to 24 carbon atoms, $R^2$ is H, a $PO(OH)_2$ radical, or the optionally partially phosphated radical of a monosaccharide or the optionally partially phosphated radical of an alditol, AO stands for one or more alkylene oxide radicals selected from the group consisting of ethylene oxide and propylene oxide, and the ethylene oxide fraction in the entirety of the radicals AO is at least 70 mol %, r is 0 or 1, and s is 0 or s is 6 to 20.

3. The pigmented composition as claimed in claim 1, wherein the at least one compound of the general formula (I) is present in a total amount of 0.1 to 10 wt %, based on the total weight of the pigmented composition.

4. The pigmented composition as claimed in claim 1, wherein the polyether-modified alkylpolysiloxane comprises at least one structural unit $(R^7)_2(OR^6)SiO_{1/2}$ and at least one structural unit $(R^7)_2SiO_{2/2}$, wherein $R^6$ is an ethylene oxide, propylene oxide, and butylene oxide group, and R is a $C_1$-$C_{10}$ alkyl group.

5. The pigmented composition as claimed in claim 1, wherein the at least one polyether-modified alkylpolysiloxane is present in a total amount of 0 wt % or of 0.1 to 6 wt %, based on the total weight of the pigmented composition.

6. The pigmented composition as claimed in claim 1, wherein, in the general formula (II), $R^3$ is a $(HO-CH_2)_2-C(CH_2-CH_3)-CH_2-O-(CH_2)_3-*$ radical, $R^4$ is a methyl group, $R^5$ is a methyl group, a is 0, and b is 7 to 14.

7. The pigmented composition as claimed in claim 1, which comprises the at least one polysiloxane of the general formula (II) in a total amount of 0.1 to 5 wt %, based on the total weight of the pigmented composition.

8. The pigmented composition as claimed in claim 1, wherein the at least one color base BF is present in a total amount of 5 to 40 wt %, based on the total weight of the pigmented composition.

9. The pigmented composition as claimed in claim 1, wherein the color base BF, based on its total weight, comprises
(a1) 0.5 to 70 wt % of at least one effect pigment, and/or of at least one coloring pigment,
(a2) 10 to 80 wt % of at least one binder selected from the group of polyurethane polymers, amino resin polymers, polyacrylate polymers, polyester polymers, and mixtures thereof, and
(a3) at least one organic solvent.

10. The pigmented composition as claimed in claim 1, which additionally comprises at least one binder B.

11. The pigmented composition as claimed in claim 10, wherein the binder B is selected from the group consisting of (i) poly(meth)acrylates, (ii) polyurethanes, (iii) polyesters, (iv) polyethers, (v) copolymers of the polymers thereof, and (vi) mixtures thereof.

12. The pigmented composition as claimed in claim 1, which additionally comprises at least one crosslinking agent V.

13. The pigmented composition as claimed in claim 12, wherein the at least one crosslinking agent V is present in a total amount of 10 wt % to 40 wt %, based on the total weight of the pigmented composition.

14. A process for producing a coated molding, by
(A) applying the pigmented composition as claimed in claim 1 to a surface of a molding tool to form a coating material film,
(B) flashing the coating material film,
(C) applying a composition forming a component to the flashed coating material film,
(D) crosslinking the composition and the coating material film to form a coated component, and
(E) subsequently removing the coated component.

15. The pigmented composition as claimed in claim 1, wherein the at least one compound of the general formula (I) is present in a total amount of 0.5 to 5 wt %, based on the total weight of the pigmented composition.

16. The pigmented composition as claimed in claim 1, wherein the polyether-modified alkylpolysiloxane comprises at least one structural unit $(R^7)_2(OR^6) SiO_{1/2}$ and at least one structural unit $(R^7)_2SiO_{2/2}$, wherein $R^6$ is a mixture of ethylene oxide and propylene oxide and butylene oxide groups, and $R^7$ is a methyl group.

17. The pigmented composition as claimed in claim 1, wherein the at least one polyether-modified alkylpolysiloxane is present in a total amount of 0.5 to 4 wt %, based on the total weight of the pigmented composition.

18. The pigmented composition as claimed in claim 1, wherein the at least one polysiloxane of the general formula (II) is present in a total amount of 0.5 to 4 wt %, based on the total weight of the pigmented composition.

19. The pigmented composition as claimed in claim 1, wherein the binder B is selected from the group consisting of (i) hydroxy-functional and/or carboxylate-functional and/or amine-functional poly(meth)acrylates, (ii) hydroxy-functional and/or carboxylate-functional and/or amine-functional polyurethanes, (iii) polyester polyols, (iv) polyether polyols, (v) copolymers of the polymers thereof, and (vi) mixtures thereof.

* * * * *